(12) United States Patent
Xu et al.

(10) Patent No.: US 12,388,964 B2
(45) Date of Patent: Aug. 12, 2025

(54) METHOD AND APPARATUS FOR OBTAINING A MAPPING CURVE PARAMETER

(71) Applicant: HUAWEI TECHNOLOGIES CO., LTD., Guangdong (CN)

(72) Inventors: Weiwei Xu, Hangzhou (CN); Quanhe Yu, Beijing (CN); Hu Chen, Munich (DE); Yichuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 17/976,426

(22) Filed: Oct. 28, 2022

(65) Prior Publication Data

US 2023/0042923 A1  Feb. 9, 2023

Related U.S. Application Data

(63) Continuation of application No. PCT/CN2021/088679, filed on Apr. 21, 2021.

(30) Foreign Application Priority Data

Apr. 30, 2020  (CN) .......................... 202010366684.2

(51) Int. Cl.
 *H04N 9/77* (2006.01)
 *G06T 5/92* (2024.01)
(52) U.S. Cl.
 CPC .............. *H04N 9/77* (2013.01); *G06T 5/92* (2024.01); *G06T 2207/20208* (2013.01)
(58) Field of Classification Search
 None
 See application file for complete search history.

(56) References Cited

U.S. PATENT DOCUMENTS

| 6,753,987 B1 | 6/2004 | Farnung et al. |
| 9,621,767 B1 | 4/2017 | El Mezeni et al. |

(Continued)

FOREIGN PATENT DOCUMENTS

| CN | 108491121 A | 9/2018 |
| CN | 109691119 A | 4/2019 |

(Continued)

OTHER PUBLICATIONS

ATSC, ATSC Candidate Standard: Amendment to A/341:2019-ST 2094-40, ATSC Candidate Standard, USA, ATSC, Sep. 24, 2019, total 15 pages.

(Continued)

*Primary Examiner* — Delomia L Gilliard
(74) *Attorney, Agent, or Firm* — WOMBLE BOND DICKINSON (US) LLP

(57) ABSTRACT

A mapping curve parameter obtaining method and apparatus are described. The method includes obtaining a first mapping curve parameter set and first maximum target system display luminance, and obtaining a display luminance parameter set, where the display luminance parameter set includes maximum display luminance and/or minimum display luminance of a display device. The method also includes obtaining an adjustment coefficient set, where the adjustment coefficient set includes one or more adjustment coefficients, and the one or more adjustment coefficients correspond to one or more parameters in the first mapping curve parameter set. Furthermore, the method includes adjusting the one or more parameters in the first mapping curve parameter set based on the display luminance parameter set, the first maximum target system display luminance, and the adjustment coefficient set to obtain a second mapping curve parameter set, where the second mapping curve parameter set includes one or more adjusted parameters.

14 Claims, 10 Drawing Sheets

(56) References Cited

U.S. PATENT DOCUMENTS

2005/0104900 A1    5/2005  Toyama et al.
2016/0292834 A1*  10/2016  Tsuru ..................... H04N 23/83
2018/0114505 A1    4/2018  Heywood-Lonsdale et al.
2018/0350047 A1  12/2018  Baar et al.
2019/0311694 A1  10/2019  Van Mourik et al.

FOREIGN PATENT DOCUMENTS

| CN | 110867172 A | 3/2020 |
| CN | 113596428 B | 12/2022 |
| JP | 2017184249 A | 10/2017 |
| JP | 2019530309 A | 10/2019 |
| JP | 2019207603 A | 12/2019 |
| TW | 201701648 A | 1/2017 |
| TW | 202005368 A | 1/2020 |

OTHER PUBLICATIONS

ETSI TS 1 03 433-1 V1.3.1 (Mar. 2020), High-Performance Single Layer High Dynamic Range (HDR) System for use in Consumer Electronics devices; Part 1: Directly Standard Dynamic Range (SDR) Compatible HDR System (SL-HDR1), 129 pages, XP014366989.

* cited by examiner

METHOD AND APPARATUS FOR OBTAINING A MAPPING CURVE PARAMETER

CROSS-REFERENCE TO RELATED APPLICATIONS

This application is a continuation of International Application No. PCT/CN2021/088679, filed on Apr. 21, 2021, which claims priority to Chinese Patent Application No. 202010366684.2, filed on Apr. 30, 2020. The disclosures of the aforementioned applications are hereby incorporated by reference in their entireties.

TECHNICAL FIELD

This application relates to the field of image processing, and in particular, to a mapping curve parameter obtaining method and apparatus.

BACKGROUND

A dynamic range is used to indicate a ratio of a maximum value to a minimum value of a variable in many fields. In a digital image, the dynamic range indicates a ratio of a maximum grayscale value to a minimum grayscale value in an image displayable range. In a same scene in the real world, a dynamic range in the real world is usually between $10^{-3}$ candela/m$^2$ (cd/m$^2$) and $10^6$ cd/m$^2$, and is referred to as a high dynamic range (HDR). Currently, in most color digital images, 0 to 255 are a dynamic image range, which is referred to as a low dynamic range (LDR).

Because there is a difference between an illuminance range of a display device and the dynamic range in the real world, the dynamic range in the real world needs to be mapped to the illuminance range of the display device, which is referred to as dynamic-range mapping. Dynamic-range mapping may be applied to adaptation between an HDR signal from a front end and an HDR display device of a back end. For example, the front end collects an illumination signal at 4000 cd/m$^2$, the HDR display device of the back end has an HDR display capability of 500 cd/m$^2$, and mapping the illumination signal at 4000 cd/m$^2$ to the 500 cd/m$^2$ display device is a tone mapping (TM) process from high to low. Dynamic-range mapping may also be applied to adaptation between a standard dynamic range (SDR) signal from the front end and the HDR display device of the back end. For example, the front end collects an illumination signal at 100 cd/m$^2$, the HDR display capability of the HDR display device of the back end is 2000 cd/m$^2$, and mapping the illumination signal at 100 cd/m$^2$ to the 2000 cd/m$^2$ display device is a TM process from low to high.

Currently, there are two dynamic-range mapping methods: static mapping and dynamic mapping. In a static mapping method, a single piece of data is used to perform an overall TM process based on same video content or same hard disk content. In other words, there is usually a same mapping curve for various scenes. This method has advantages that an image needs to carry less data and a processing procedure is simple, but has a disadvantage that information may be lost in some scenes because the same mapping curve is used for TM in all scenes. For example, if the mapping curve focuses on protecting bright regions, some details may be lost or even invisible in some extremely dark scenes. Consequently, image display effect is affected. According to the dynamic mapping method, a mapping curve is dynamically adjusted for each scene or each frame of content based on a specific region. This method has an advantage that differentiated processing can be implemented for different scenes or frames, but has a disadvantage that an image needs to carry a large amount of data because related scene information needs to be carried in each frame or scene.

SUMMARY

Embodiments of this application provide a mapping curve parameter obtaining method and apparatus, to achieve high flexibility by performing more accurate tone adjustment on display devices with different luminance.

According to a first aspect, an embodiment of this application provides a mapping curve parameter obtaining method. The method includes: obtaining a first mapping curve parameter set and first maximum target system display luminance, where the first mapping curve parameter set corresponds to the first maximum target system display luminance, and the first mapping curve parameter set includes one or more parameters related to a mapping curve; obtaining a display luminance parameter set, where the display luminance parameter set includes maximum display luminance and/or minimum display luminance of a display device; obtaining an adjustment coefficient set, where the adjustment coefficient set includes one or more adjustment coefficients, and the one or more adjustment coefficients correspond to the one or more parameters in the first mapping curve parameter set; and adjusting the one or more parameters in the first mapping curve parameter set based on the display luminance parameter set, the first maximum target system display luminance, and the adjustment coefficient set to obtain a second mapping curve parameter set, where the second mapping curve parameter set includes one or more adjusted parameters.

In this application, the one or more parameters related to the mapping curve are adjusted. In the adjustment process, a display capability of a back end is considered, and therefore more accurate tone adjustment can be performed on display devices with different luminance. This greatly improves flexibility, and also achieves good presentation effect when a curve parameter is appropriately configured.

In a possible embodiment, the adjusting the one or more parameters in the first mapping curve parameter set based on the display luminance parameter set, the first maximum target system display luminance, and the adjustment coefficient set to obtain a second mapping curve parameter set includes: calculating an adjusted first parameter according to formula (1), where a first parameter is any parameter in the first mapping curve parameter set, and the adjusted first parameter belongs to the second mapping curve parameter set:

$$P_a = P_b + k \times P_\Delta \tag{1}$$

where $P_a$ represents the adjusted first parameter, $P_b$ represents the first parameter, $P_\Delta$ represents a adjustment coefficient corresponding to the first parameter, and $$k = \left(\frac{MaxDisplay - M_{TPL}}{M}\right)^N$$

or $$k = a \times \left(\frac{|MaxDisplay - M_{TPL}|}{M}\right)^N,$$

where a=1 when MaxDisplay>$M_{TPL}$, or a=−1 when; MaxDisplay≤$M_{TPL}$; MaxDisplay represents the maximum display luminance, $M_{TPL}$ represents the first maximum target system display luminance, N represents an adjustment control parameter, and M represents a preset luminance value.

The one or more parameters related to the mapping curve are adjusted based on the adjustment coefficient. In the adjustment process, a display capability of a back end is considered, and therefore more accurate tone adjustment can be performed on display devices with different luminance. This greatly improves flexibility, and also achieves good presentation effect when a curve parameter is appropriately configured.

In a possible embodiment, before the adjusting the one or more parameters in the first mapping curve parameter set based on the display luminance parameter set, the first maximum target system display luminance, and the adjustment coefficient set to obtain a second mapping curve parameter set, the method further includes: obtaining one or more of maximum luminance, minimum luminance, an average value, and a variation range of to-be-displayed content; and obtaining an intermediate value of a first parameter based on one or more of the maximum display luminance, the minimum display luminance, the maximum luminance, the minimum luminance, the average value, and the variation range, where the first parameter is any parameter in the first mapping curve parameter set. The adjusting the one or more parameters in the first mapping curve parameter set based on the display luminance parameter set, the first maximum target system display luminance, and the adjustment coefficient set to obtain a second mapping curve parameter set includes: calculating an adjusted first parameter according to formula (2), where the adjusted first parameter belongs to the second mapping curve parameter set:

$$P_a = (1-w) \times P_b + w \times P_m \quad (2)$$

where $P_a$ represents the adjusted first parameter, $P_b$ represents the first parameter, and $$w = P_\Delta \times \left( \frac{MaxDisplay - M_{TPL}}{M} \right)^N$$

or $$w = P_\Delta \times \left( \frac{|MaxDisplay - M_{TPL}|}{M} \right)^N,$$

where $P_\Delta$ represents a adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

The one or more parameters related to the mapping curve are obtained in a weighted manner by using a plurality of parameters. In the adjustment process, a display capability of a back end is considered, and therefore more accurate tone adjustment can be performed on display devices with different luminance. This greatly improves flexibility, and also achieves good presentation effect when a curve parameter is appropriately configured.

In a possible embodiment, after the calculating an adjusted first parameter according to a formula, the method further includes: obtaining a first mapping curve based on the adjusted first parameter and a parameter in the first mapping curve parameter set other than the first parameter, and continuing to adjust the first parameter if luminance of the to-be-displayed content obtained by performing tone mapping based on the first mapping curve is higher than original luminance of the to-be-displayed content; or analyzing the adjusted first parameter according to a preset rule, and continuing to adjust the first parameter if the adjusted first parameter complies with the preset rule.

The parameters related to the mapping curve are fine-tuned one by one to improve the accuracy of the mapping curve parameters.

In a possible embodiment, the adjusting the one or more parameters in the first mapping curve parameter set based on the display luminance parameter set, the first maximum target system display luminance, and the adjustment coefficient set to obtain a second mapping curve parameter set includes: when the first mapping curve parameter set includes a scaling factor, calculating an adjusted scaling factor according to formula (3):

$$r_a = \frac{MaxDisplay}{f(MaxSource, P1_a, P2_a, \ldots)} \quad (3)$$

where $r_a$ represents the adjusted scaling factor, $P1_a$, $P2_a$, ... represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, and MaxDisplay represents the maximum display luminance.

In a possible embodiment, the adjusting the one or more parameters in the first mapping curve parameter set based on the display luminance parameter set, the first maximum target system display luminance, and the adjustment coefficient set to obtain a second mapping curve parameter set includes: when the first mapping curve parameter set includes a scaling factor, calculating an adjusted scaling factor according to formula (4):

$$r_a = \frac{MaxDisplay - MinDisplay}{f(MaxSource, P1_a, P2_a, \ldots) - f(MinSource, P1_a, P2_a, \ldots)} \quad (4)$$

where $r_a$ represents the adjusted scaling factor, $P1_a$, $P2_a$, ... represents a parameter in the second mapping curve parameter set, MaxSource represents maximum luminance of the to-be-displayed content in a memory, MinSource represents minimum luminance of the to-be-displayed content in the memory, $f(MaxSource, P1_a, P2_a, \ldots)$ represents function calculation that is related to the maximum luminance of the to-be-displayed content in the memory and one or more adjusted n the second mapping curve parameter set, $f(MinSource, P1_a, P2_a, \ldots)$ represents function calculation that is related to the minimum luminance of the to-be-displayed content in the memory and one or more adjusted parameters in the second mapping curve parameter set, MaxDisplay represents the maximum display luminance, and MinDisplay represents the minimum display luminance.

In a possible embodiment, the adjusting the one or more parameters in the first mapping curve parameter set based on the display luminance parameter set, the first maximum target system display luminance, and the adjustment coefficient set to obtain a second mapping curve parameter set includes: when the first mapping curve parameter set includes a scaling factor, calculating an adjusted scaling factor according to formula (5):

$$r_a = \frac{MaxDisplay - MinDisplay}{f(MaxSource, P1_a, P2_a, \ldots)} \quad (5)$$

where $r_a$ represents the adjusted scaling factor, $P1_a$, $P2_a$, ... represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, MaxDisplay represents the maximum display luminance, and MinDisplay represents the minimum display luminance.

In a possible embodiment, the adjusting the one or more parameters in the first mapping curve parameter set based on the display luminance parameter set, the first maximum target system display luminance, and the adjustment coefficient set to obtain a second mapping curve parameter set includes: when the first mapping curve parameter set includes a scaling factor, calculating an adjusted scaling factor according to formula (6):

$$r_a = \frac{MaxDisplay}{f(MaxSource, P1_a, P2_a, \ldots) - f(MinSource, P1_a, P2_a, \ldots)} \quad (6)$$

where $r_a$ represents the adjusted scaling factor, $P1_a$, $P2_a$, ... represents a parameter in the second mapping curve parameter set, MaxSource represents maximum luminance of the to-be-displayed content in a memory, MinSource represents minimum luminance of the to-be-displayed content in the memory, $f(MaxSource, P1_a, P2_a, \ldots)$ represents function calculation that is related to the maximum luminance of the to-be-displayed content in the memory and one or more adjusted parameters in the second mapping curve parameter set, $f(MinSource, P1_a, P2_a, \ldots)$ represents function calculation that is related to the minimum luminance of the to-be-displayed content in the memory and one or more adjusted parameters in the second mapping curve parameter set, and MaxDisplay represents the maximum display luminance.

In a possible embodiment, the obtaining a first mapping curve parameter set and first maximum target system display luminance includes: obtaining the first mapping curve parameter set and the first maximum target system display luminance from dynamic metadata of the to-be-displayed content; or obtaining the first mapping curve parameter set from dynamic metadata; and obtaining, based on a specified correspondence, the first maximum target system display luminance corresponding to the first mapping curve parameter set.

In a possible embodiment, the obtaining an adjustment coefficient set includes: obtaining the adjustment coefficient set from the dynamic metadata of the to-be-displayed content; or obtaining the adjustment coefficient set based on a preset value.

In a possible embodiment, the obtaining an adjustment coefficient set includes: directly reading one or more adjustment coefficients; or obtaining an adjustment mode, and obtaining one or more adjustment coefficients corresponding to the adjustment mode.

In a possible embodiment, the obtaining a display luminance parameter set includes: obtaining the display luminance parameter set based on device information; or obtaining the display luminance parameter set based on preset information.

In a possible embodiment, after the adjusting the one or more parameters in the first mapping curve parameter set based on the display luminance parameter set, the first maximum target system display luminance, and the adjustment coefficient set to obtain a second mapping curve parameter set, the method further includes: obtaining the mapping curve based on the one or more adjusted parameters in the second mapping curve parameter set.

According to a second aspect, an embodiment of this application provides an apparatus for processing to-be-displayed content. The apparatus includes an obtaining module and a processing module. The obtaining module is configured to: obtain a first mapping curve parameter set and first maximum target system display luminance, where the first mapping curve parameter set corresponds to the first maximum target system display luminance, and the first mapping curve parameter set includes one or more parameters related to a mapping curve; obtain a display luminance parameter set, where the display luminance parameter set includes maximum display luminance and/or minimum display luminance of a display device; and obtain an adjustment coefficient set, where the adjustment coefficient set includes one or more adjustment coefficients, and the one or more adjustment coefficients correspond to the one or more parameters in the first mapping curve parameter set. The processing module is configured to adjust the one or more parameters in the first mapping curve parameter set based on the display luminance parameter set, the first maximum target system display luminance, and the adjustment coefficient set to obtain a second mapping curve parameter set, where the second mapping curve parameter set includes one or more adjusted parameters.

In a possible embodiment, the processing module is specifically configured to calculate an adjusted first parameter according to formula (1), where a first parameter is any parameter in the first mapping curve parameter set, and the adjusted first parameter belongs to the second mapping curve parameter set:

$$P_a = P_b + k \times P_\Delta \quad (1)$$

where $P_a$ represents the adjusted first parameter, $P_b$ represents the first parameter, $P_\Delta$ represents a adjustment coefficient corresponding to the first parameter, and $$k = \left(\frac{MaxDisplay - M_{TPL}}{M}\right)^N$$

or $$k = a \times \left(\frac{|MaxDisplay - M_{TPL}|}{M}\right)^N,$$

where a=1 when MaxDisplay>$M_{TPL}$, or a=−1 when MaxDisplay≤$M_{TPL}$; MaxDisplay represents the maximum display luminance, $M_{TPL}$ represents the first maximum target system display luminance, N represents an adjustment control parameter, and M represents a preset luminance value.

In a possible embodiment, the obtaining module is further configured to: obtain one or more of maximum luminance, minimum luminance, an average value, and a variation range of to-be-displayed content; and obtain an intermediate value of a first parameter based on one or more of the maximum display luminance, the minimum display luminance, the maximum luminance, the minimum luminance, the average value, and the variation range, where the first parameter is any parameter in the first mapping curve parameter set. The processing module is specifically configured to calculate an adjusted first parameter according to formula (2), where the adjusted first parameter belongs to the second mapping curve parameter set:

$$P_a = (1-w) \times P_b + w \times P_m \qquad (2)$$

where $P_a$ represents the adjusted first parameter, $P_b$ represents the first parameter, and $$w = P_\Delta \times \left(\frac{MaxDisplay - M_{TPL}}{M}\right)^N$$

or $$w = P_\Delta \times \left(\frac{|MaxDisplay - M_{TPL}|}{M}\right)^N,$$

where $P_\Delta$ represents a adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

In a possible embodiment, the processing module is further configured to: obtain a first mapping curve based on the adjusted first parameter and a parameter in the first mapping curve parameter set other than the first parameter, and continue to adjust the first parameter if luminance of the to-be-displayed content obtained by performing tone mapping based on the first mapping curve is higher than original luminance of the to-be-displayed content; or analyze the adjusted first parameter according to a preset rule, and continue to adjust the first parameter if the adjusted first parameter complies with the preset rule.

In a possible embodiment, the processing module is specifically configured to: when the first mapping curve parameter set includes a scaling factor, calculate an adjusted scaling factor according to formula (3):

$$r_a = \frac{MaxDisplay}{f(MaxSource, P1_a, P2_a, \ldots)} \qquad (3)$$

where $r_a$ represents the adjusted scaling factor, $P1_a$, $P2_a$, ... represents a parameter in the second mapping curve parameter set, MaxSource represents maximum luminance of the to-be-displayed content in a memory, $f(MaxSource, P1_a, P2_a \ldots)$ represents function calculation that is related to the maximum luminance of the to-be-displayed content in the memory and one or more adjusted parameters in the second mapping curve parameter set, and MaxDisplay represents the maximum display luminance.

In a possible embodiment, the processing module is specifically configured to: when the first mapping curve parameter set includes a scaling factor, calculate an adjusted scaling factor according to formula (4):

$$r_a = \frac{MaxDisplay - MinDisplay}{f(MaxSource, P1_a, P2_a, \ldots) - f(MinSource, P1_a, P2_a, \ldots)} \qquad (4)$$

where $r_a$ represents the adjusted scaling factor, $P1_a$, $P2_a$, ... represents a parameter in the second mapping curve parameter set, MaxSource represents maximum luminance of the to-be-displayed content in a memory, MinSource represents minimum luminance of the to-be-displayed content in the memory, $f(MaxSource, P1_a, P2_a, \ldots)$ represents function calculation that is related to the maximum luminance of the to-be-displayed content in the memory and one or more adjusted parameters in the second mapping curve parameter set, $f(MinSource, P1_a, P2_a, \ldots)$ represents function calculation that is related to the minimum luminance of the to-be-displayed content in the memory and one or more adjusted parameters in the second mapping curve parameter set, MaxDisplay represents the maximum display luminance, and MinDisplay represents the minimum display luminance.

In a possible embodiment, the processing module is specifically configured to: when the first mapping curve parameter set includes a scaling factor, calculate an adjusted scaling factor according to formula (5):

$$r_a = \frac{MaxDisplay - MinDisplay}{f(MaxSource, P1_a, P2_a, \ldots)} \qquad (5)$$

where $r_a$ represents the adjusted scaling factor, $P1_a$, $P2_a$, ... represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, MaxDisplay represents the maximum display luminance, and MinDisplay represents the minimum display luminance.

In a possible embodiment, the processing module is specifically configured to: when the first mapping curve parameter set includes a scaling factor, calculate an adjusted scaling factor according to formula (6):

$$r_a = \frac{MaxDisplay}{f(MaxSource, P1_a, P2_a, \ldots) - f(MinSource, P1_a, P2_a, \ldots)} \qquad (6)$$

where $r_a$ represents the adjusted scaling factor, $P1_a$, $P2_a$, ... represents a parameter in the second mapping curve parameter set, MaxSource represents maximum luminance of the to-be-displayed content in a memory, MinSource represents minimum luminance of the to-be-displayed content in the memory, $f(MaxSource, P1_a, P2_a, \ldots)$ represents function calculation that is related to the maximum luminance of the to-be-displayed content in the memory and one or more adjusted parameters in the second mapping curve parameter set, $f(MinSource, P1_a, P2_a, \ldots)$ represents function calculation that is related to the minimum luminance of the to-be-displayed content in the memory and one or more adjusted parameters in the second mapping curve parameter set, and MaxDisplay represents the maximum display luminance.

In a possible embodiment, the obtaining module is configured to: obtain the first mapping curve parameter set and the first maximum target system display luminance from dynamic metadata of the to-be-displayed content; or obtain the first mapping curve parameter set from dynamic metadata; and obtain, based on a specified correspondence, the first maximum target system display luminance corresponding to the first mapping curve parameter set.

In a possible embodiment, the obtaining module is configured to: obtain the adjustment coefficient set from the dynamic metadata of the to-be-displayed content; or obtain the adjustment coefficient set based on a preset value.

In a possible embodiment, the obtaining module is configured to: directly read one or more adjustment coefficients; or obtain an adjustment mode, and obtain one or more adjustment coefficients corresponding to the adjustment mode.

In a possible embodiment, the obtaining module is configured to: obtain the display luminance parameter set based on device information; or obtain the display luminance parameter set based on preset information.

In a possible embodiment, the obtaining module is further configured to obtain the mapping curve based on the one or more adjusted parameters in the second mapping curve parameter set.

According to a third aspect, an embodiment of this application provides a terminal device, including one or more processors and a memory. The memory is configured to store one or more programs. When the one or more programs are executed by the one or more processors, the one or more processors are enabled to perform the method according to any one of the first aspect.

According to a fourth aspect, an embodiment of this application provides a computer-readable storage medium. The computer-readable storage medium stores program code, and the program code includes instructions used to perform a part or all of the operations of any method in the first aspect.

According to a fifth aspect, an embodiment of this application provides a computer program product. When the computer program product runs on a computer, the computer is enabled to perform a part or all of the operations of any method in the first aspect.

It should be understood that the technical solutions in the second aspect to the fifth aspect of this application are consistent with the technical solution in the first aspect of this application. Beneficial effects achieved in the aspects and the corresponding feasible embodiments are similar, and details are not described again.

BRIEF DESCRIPTION OF DRAWINGS

To describe technical solutions in embodiments or background of this application more clearly, the following briefly describes the accompanying drawings used for embodiments or background of this application.

DESCRIPTION OF EMBODIMENTS

Figure 1:
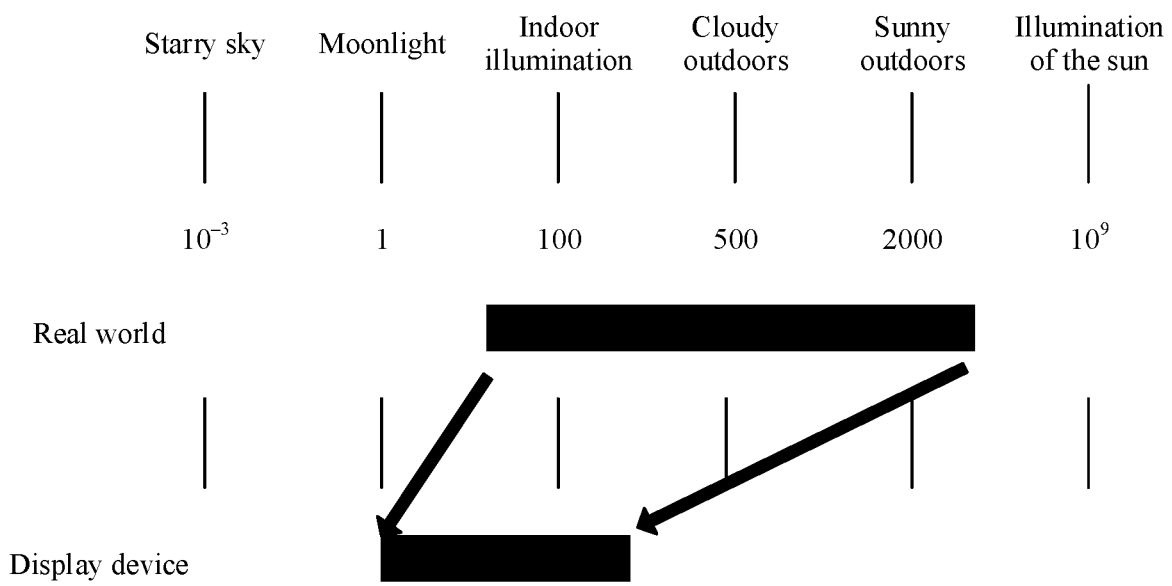
FIG. 1 is a diagram of an example of dynamic-range mapping in an imaging process in the real world.

The following describes embodiments of this application with reference to the accompanying drawings in embodiments of this application. In the following description, reference is made to the accompanying drawings, which form a part of this disclosure and show, by way of illustration, specific aspects of embodiments of this application or specific aspects in which embodiments of this application may be used. It should be understood that embodiments of this application may be used in other aspects, and may include structural or logical changes not depicted in the accompanying drawings. Therefore, the following detailed descriptions shall not be understood in a limiting sense, and the scope of this application is defined by the appended claims. For example, it should be understood that the disclosure with reference to the described method may also be applied to a corresponding device or system for performing the method, and vice versa. For example, if one or more specific method operations are described, a corresponding device may include one or more units such as functional units for performing the described one or more method operations (for example, one unit performs the one or more operations; or a plurality of units, each of which performs one or more of the plurality of operations), even if such one or more units are not explicitly described or illustrated in the accompanying drawings. In addition, for example, if a specific apparatus is described based on one or more units such as a functional unit, a corresponding method may include one operation for implementing functionality of one or more units (for example, one operation for implementing functionality of one or more units; or a plurality of operations, each of which is for implementing functionality of one or more units in a plurality of units), even if such one or more of operations are not explicitly described or illustrated in the accompanying drawings. Further, it should be understood that features of various example embodiments and/or aspects described in this specification may be combined with each other, unless otherwise specified.

Terms used in embodiments of this application are used only to explain specific embodiments of this application, but are not intended to limit this application. The following first briefly describes some related concepts in embodiments of this application.

1. Dynamic Range

The dynamic range is used to indicate a ratio of a maximum value to a minimum value of a variable in many fields. In a digital image, the dynamic range indicates a ratio of a maximum grayscale value to a minimum grayscale value in an image displayable range.

In the nature, luminance of a night scene under the starry sky is about 0.001 cd/m², luminance of the sun itself is up to $10^9$ cd/m², and a dynamic range can reach $10^9/0.001=10^{12}$ cd/m². However, in the real world of the nature, the luminance of the sun and luminance of starlight are not obtained simultaneously. Therefore, in a same scene in the real world, a dynamic range in the real world is usually between $10^{-3}$ cd/m² and $10^6$ cd/m², and is referred to as a high dynamic range (HDR). In most color digital images, grayscales of red (R), green (G), and blue (B) channels each are stored by using one byte. That is, grayscale ranges of the R, G, and B channels are 0-255. 0-255 is a dynamic range of the image, and is referred to as a low dynamic range (LDR).

2. Optical-Electro Transfer Function (OETF)

An imaging process of a digital camera is actually mapping from a high dynamic range of the real world to a low dynamic range of the digital image. FIG. 1 is a diagram of an example of dynamic-range mapping in an imaging process in the real world. As shown in FIG. 1, in the real world, in addition to luminance of starlight and luminance of the sun, the following luminance is further included: luminance of moonlight at 1 cd/m², indoor lighting luminance at 100 cd/m², luminance in cloudy weather outdoors at 500 cd/m², and luminance in sunny weather outdoors at 2000 cd/m². In the real world, there is a mapping relationship between the luminance range from 100 cd/m² to 2000 cd/m² and a luminance range from 1 cd/m² to 200 cd/m² corresponding to a storage mode of a display device.

Because the luminance corresponding to the storage mode of the display device cannot reach high luminance in the real world, an optical-electro transfer function (EOTF) is required to represent the luminance in the real world as the luminance corresponding to the storage mode of the display device. For example, if the luminance in the real world is 10000 cd/m², and the display device stores luminance information by using 10 bits, a storable maximum value in this storage mode is 1023. Therefore, 10000 cd/m² may be represented as 1023.

An earlier display device is a cathode ray tube (CRT) display, and an optical-electro transfer function of the cathode ray tube (CRT) display is a gamma function. The gamma function is defined in ITU-R Recommendation BT.1886:

$$V = \begin{cases} 1.099L^{0.45} - 0.099, & 1 \ge L \ge 0.018 \\ 4.500, & 0.018 \ge L \ge 0 \end{cases}.$$

Illuminance ranges of display devices continuously increase with upgrade of the display devices. Illuminance of an existing HDR display reaches 600 cd/m², while illuminance of a high-end HDR display can reach 2000 cd/m². Therefore, an improved optical-electro transfer function is required to adapt to upgrade of a display device. Currently, common optical-electro transfer functions include three types: a perceptual quantizer (PQ) optical-electro transfer function, a hybrid log-gamma (HLG) optical-electro transfer function, and a scene luminance fidelity (SLF) optical-electro transfer function.

Figure 2:
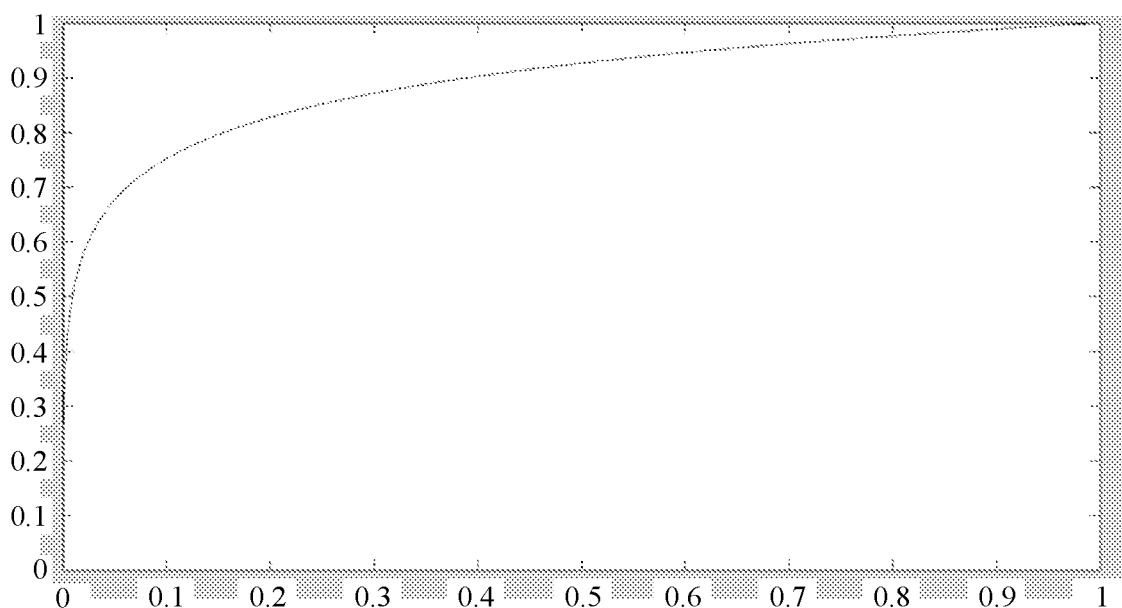
FIG. 2 is a schematic diagram of an example of a curve of a PQ optical-electro transfer function.

(1) Different from a conventional gamma function, the PQ optical-electro transfer function is proposed based on a contrast perception model of human eyes under different luminance. The PQ optical-electro transfer function represents a relationship of conversion from a linear signal value of a pixel of an image frame to a nonlinear signal value in a PQ domain. FIG. 2 is a schematic diagram of an example of a curve of a PQ optical-electro transfer function. The PQ optical-electro transfer function may be expressed as:

$$\begin{cases} R' = \text{PQ\_TF}(\max(0, \min(R/10000, 1))) \\ G' = \text{PQ\_TF}(\max(0, \min(G/10000, 1))) \\ B' = \text{PQ\_TF}(\max(0, \min(B/10000, 1))) \end{cases}.$$

Parameters corresponding to R, G, and B in the foregoing formula may be calculated according to formula $$L' = \text{PQ\_TF}(L) = \left(\frac{c_1 + c_2 L^{m_1}}{1 + c_3 L^{m_1}}\right)^{m_2},$$

where L represents a linear signal value of a pixel of an image frame, and a value of L is normalized to [0, 1]; L' represents a nonlinear signal value in a PQ domain, and a value range of L' is [0, 1]; and all of $m_1$, $m_2$, $c_1$, $c_2$, and $c_3$ are PQ photoelectric transfer coefficients, where $$m_1 = \frac{2610}{4096} \times \frac{1}{4} = 0.159301758125, \ m_2 = \frac{2523}{4096} \times 128 = 78.84375,$$

$$c_2 = \frac{2413}{4096} \times 32 = 18.8515625, \ c_3 = \frac{2392}{4096} \times 32 = 18.6875,$$

$$\text{and } c_1 = c_3 - c_2 + 1 = \frac{3424}{4096} = 0.8359375.$$

Figure 3:
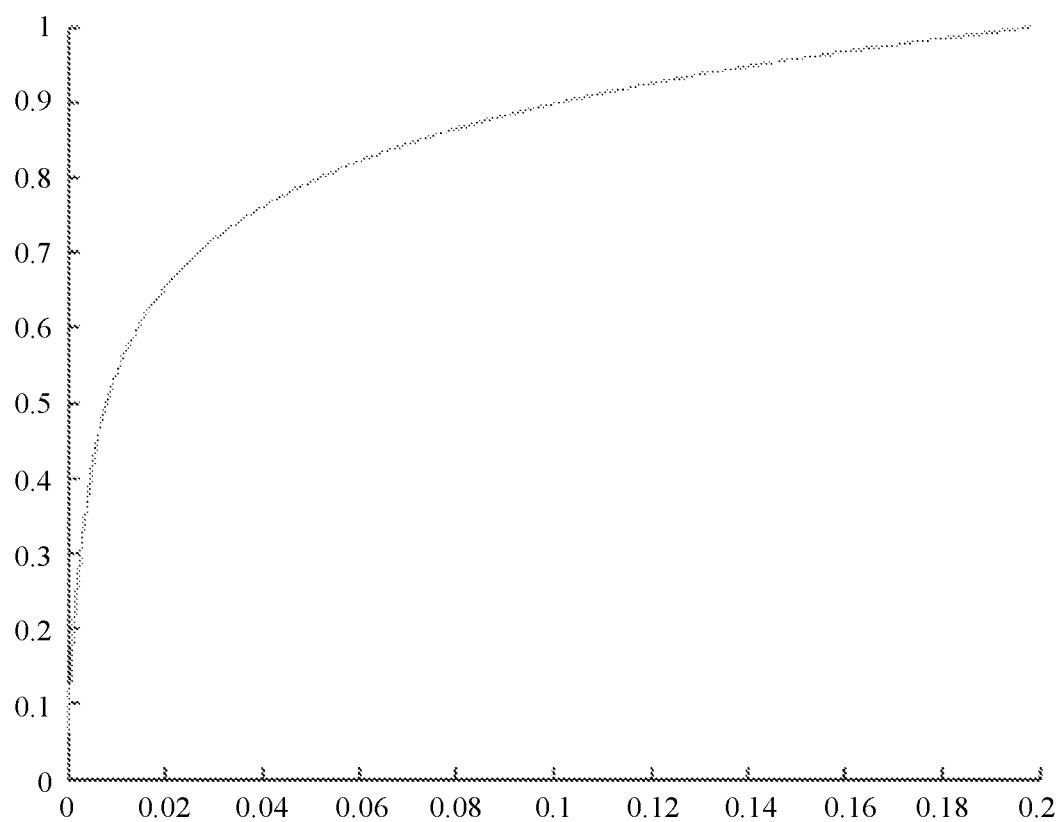
FIG. 3 is a schematic diagram of an example of a curve of an HLG optical-electro transfer function.

(2) The HLG optical-electro transfer function is obtained by improving a conventional gamma curve. The HLG optical-electro transfer function uses the conventional gamma curve in a low segment and supplements the log curve in a high segment. The HLG optical-electro transfer function represents a relationship of conversion from a linear signal value of a pixel of an image frame to a nonlinear signal value in an HLG domain. FIG. 3 is a schematic diagram of an example of a curve of an HLG optical-electro transfer function. The HLG optical-electro transfer function may be expressed as:

$$L' = \text{HLG\_TF}(L) = \begin{cases} \sqrt{L}/2, & 0 \le L \le 1 \\ a\ln(L-b) + c, & 1 > L \end{cases}.$$

L represents a linear signal value of a pixel of an image frame, and a value range of L is [0, 12]; L' represents a nonlinear signal value in an HLG domain, and a value range of L' is [0, 1]; and all or a, b, and c are HLG optical-electro transfer coefficients, where a=0.17883277, b=0.28466892, and c=0.55991073.

Figure 4:
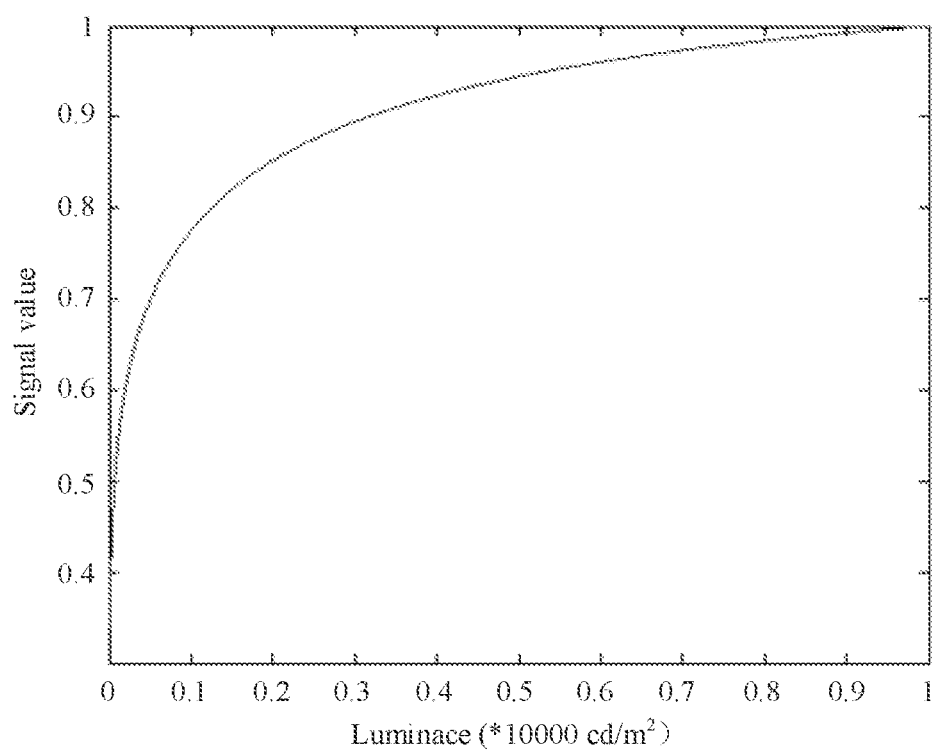
FIG. 4 is a schematic diagram of an example of a curve of an SLF optical-electro transfer function.

(3) The SLF optical-electro transfer function is obtained based on luminance distribution in an HDR scenario on the premise that optical characteristics of human eyes are satisfied. The SLF optical-electro transfer function represents a relationship of conversion from a linear signal value of a pixel of an image frame to a nonlinear signal value in an SLF domain. FIG. 4 is a schematic diagram of an example of a curve of an SLF optical-electro transfer function. The SLF optical-electro transfer function may be expressed as:

$$\begin{cases} R' = \text{SLF\_TF}(\max(0, \min(R/10000, 1))) \\ G' = \text{SLF\_TF}(\max(0, \min(G/100001,))) \\ B' = \text{SLF\_TF}(\max(0, \min(B/10000, 1))) \end{cases}$$

Parameters corresponding to R, G, and B in the foregoing formula may be calculated according to formula $$L' = \text{SLF\_TF}(L) = a \times \left( \frac{p \times L}{(p-1) \times L} \right)^m + b,$$

where L represents a linear signal value of a pixel of an image frame, and a value of L is normalized to [0, 1]; L' represents a nonlinear signal value in a PQ domain, and a value range of L' is [0, 1]; and all of p, m, a, and b are SLF optical-electro transfer coefficients, where p=2.3, m=0.14, a=1.12762, and b=−0.12762.

3. Dynamic-Range Mapping

Dynamic-range mapping may be applied to adaptation between an HDR signal from a front end and an HDR display device of a back end. For example, the front end collects an illumination signal at 4000 cd/m², the HDR display device of the back end has an HDR display capability of 500 cd/m², and mapping the illumination signal at 4000 cd/m² to the 500 cd/m² display device is a tone mapping (TM) process from high to low. Dynamic-range mapping may also be applied to adaptation between an SDR signal from the front end and the HDR display device of the back end. For example, the front end collects an illumination signal at 100 cd/m², the HDR display capability of the HDR display device of the back end is 2000 cd/m², and mapping the illumination signal at 100 cd/m² to the 2000 cd/m² display device is a TM process from low to high.

Currently, there are two dynamic-range mapping methods: static mapping and dynamic mapping. In a static mapping method, a single piece of data is used to perform an overall TM process based on same video content or same hard disk content. That is, there is usually a same mapping curve for various scenes. This method has advantages that a video needs to carry less data and a processing procedure is simple, but has a disadvantage that information may be lost in some scenes because the same mapping curve is used for TM in all scenes. For example, if the mapping curve focuses on protecting bright regions, some details may be lost or even invisible in some extremely dark scenes. Consequently, video display effect is affected. According to the dynamic mapping method, a mapping curve is dynamically adjusted for each scene or each frame of content based on a specific region. This method has an advantage that differentiated processing can be implemented for different scenes or frames, but has a disadvantage that a video needs to carry a large amount of data because related scene information needs to be carried in each frame or scene.

4. TM Technology (1) TM Process Based on a Sigmoid Curve

Figure 5:
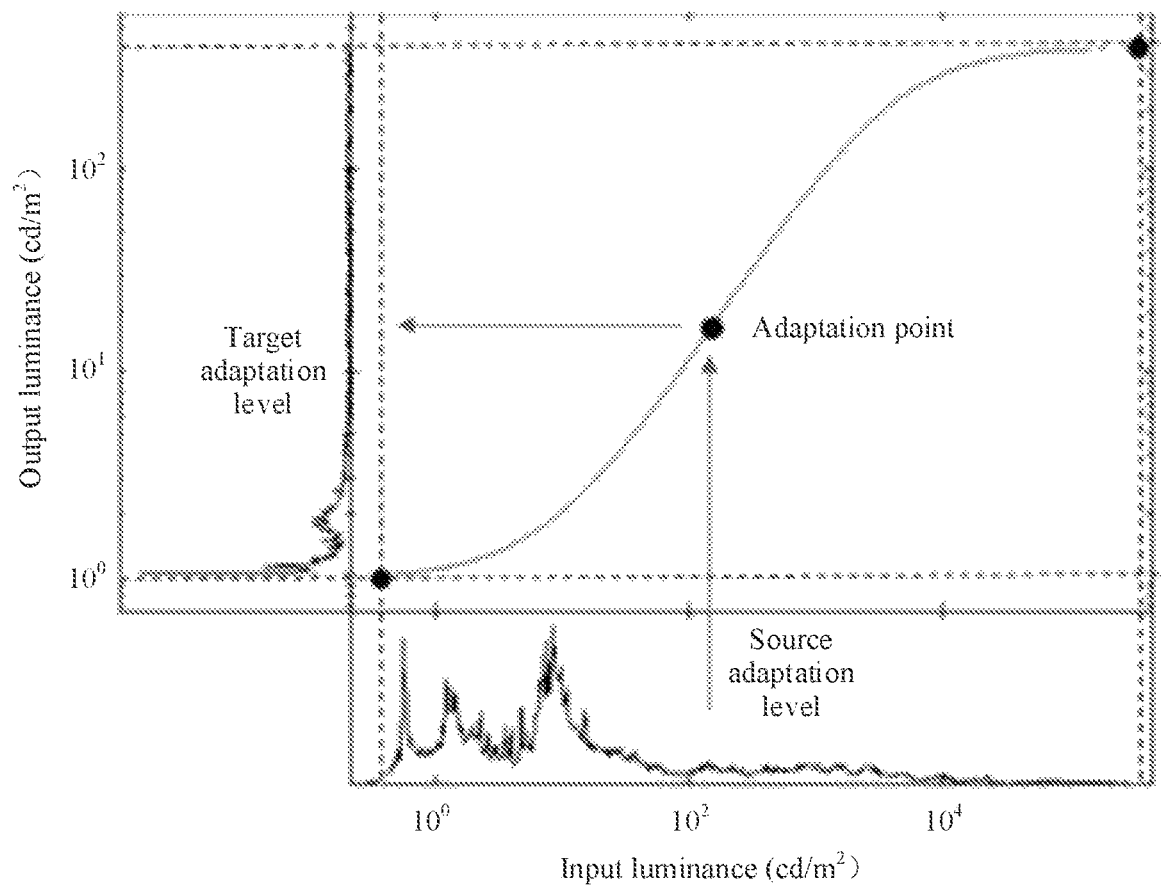
FIG. 5 is a schematic diagram of an example of a sigmoid curve.

FIG. 5 is a schematic diagram of an example of a sigmoid curve.

(2) TM Process Based on a Bezier Curve

Figure 6:
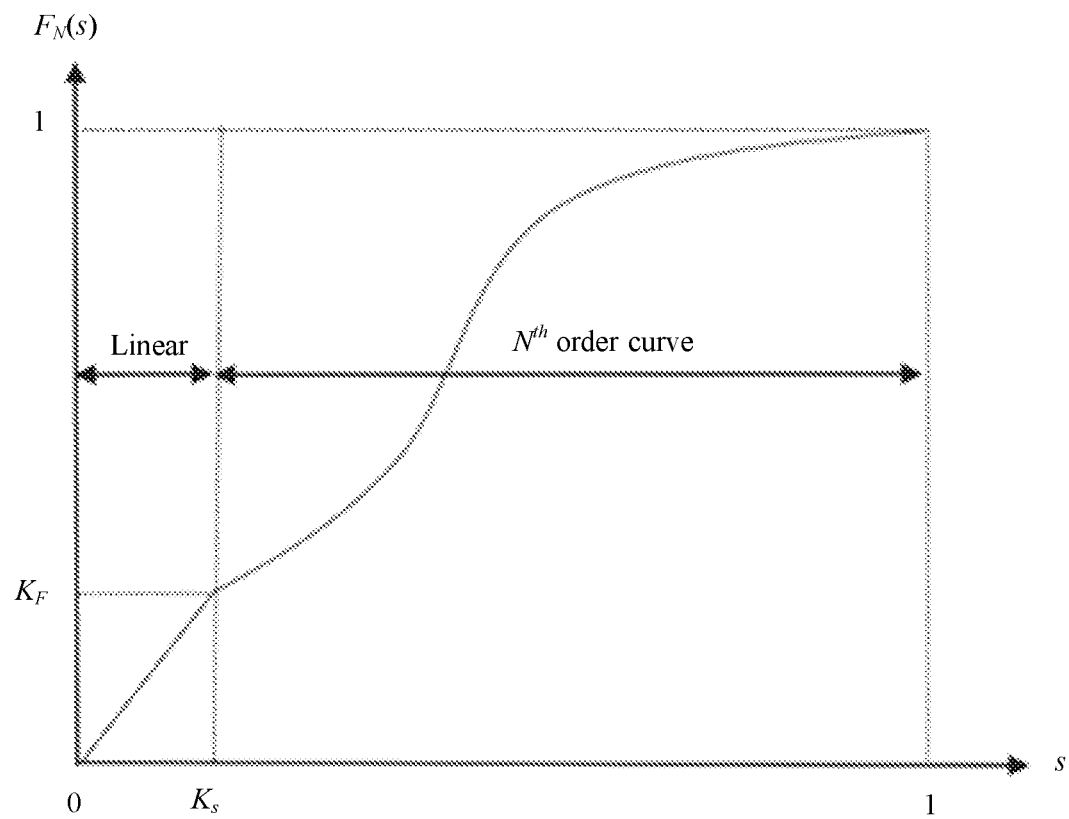
FIG. 6 is a schematic diagram of an example of a Bezier curve.

FIG. 6 is a schematic diagram of an example of a Bezier curve.

(3) TM Process Based on an S-Shaped Curve Perceived by Human Eyes

Figure 7:
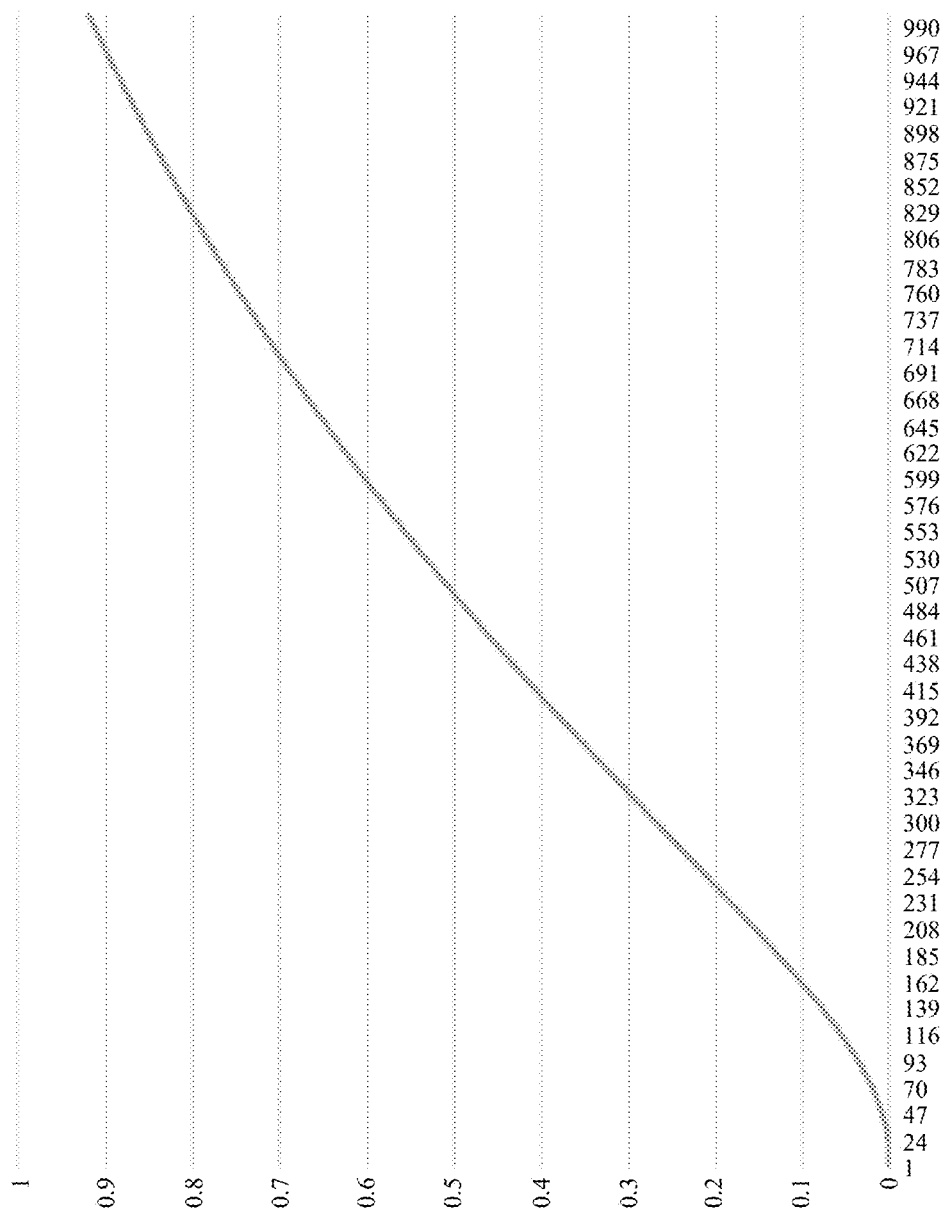
FIG. 7 is a schematic diagram of an example of an S-shaped curve.

FIG. 7 is a schematic diagram of an example of an S-shaped curve. An optical-electro transfer function corresponding to the S-shaped curve may be expressed as:

$$L' = F(L) = a \times \left( \frac{p \times L^n}{(k_1 \times p - k_2)L^n + k_3} \right)^m + b.$$

Each of L and L' is a normalized electrical signal or an optical signal, and value ranges of both L and L' are [0, 1]; a value range of a is [0, 1]; a value range of b is [0, 1]; a value range of each of p, n, and m is [0, N], where N is a rational number greater than 0.1; and all of $k_1$, $k_2$, and $k_3$ are rational numbers.

5. Dynamic Metadata

A front end (video collection and/or production) includes, in dynamic metadata sent to a back end (video displaying), parameters related to a mapping curve.

(1) Sigmoid Curve

Dynamic metadata definition related to the sigmoid curve proposed in ST2094-10 includes not only statistical values of a video such as a maximum luminance value (Maximum PQ-encoded maxRGB), a minimum luminance value (Minimum PQ-encoded maxRGB), and an average luminance value (Average PQ-encoded maxRGB); but also parameters related to the sigmoid curve such as a tone mapping offset, a tone mapping gain, and a tone mapping gamma, to directly generate the sigmoid curve.

However, a manner of generating the foregoing parameters is fixed. Consequently, the parameters included in the dynamic metadata cannot provide more flexibility for curve generation.

(2) Bezier Curve

Dynamic metadata definition related to the Bezier curve proposed in ST2094-40 includes histogram information (Distribution MaxRGB) and parameters related to the Bezier curve (Bezier curve anchors), to directly generate the Bezier curve.

In addition, the ST2094 series standards include maximum (peak) target system display luminance (targeted_system_display_maximum_luminance, TSDAPL).

The foregoing parameters correspond to TSDAPL when being generated at the front end, but a same curve is used for different display devices at the back end. Consequently, best display effect cannot be achieved.

(3) S-Shaped Curve

Dynamic metadata may include statistical values of a video such as a maximum luminance value, a minimum luminance value, and an average luminance value; or may include parameters related to the S-shaped curve such as p, m, a, b, n, K1, K2, and K3.

Figure 8:
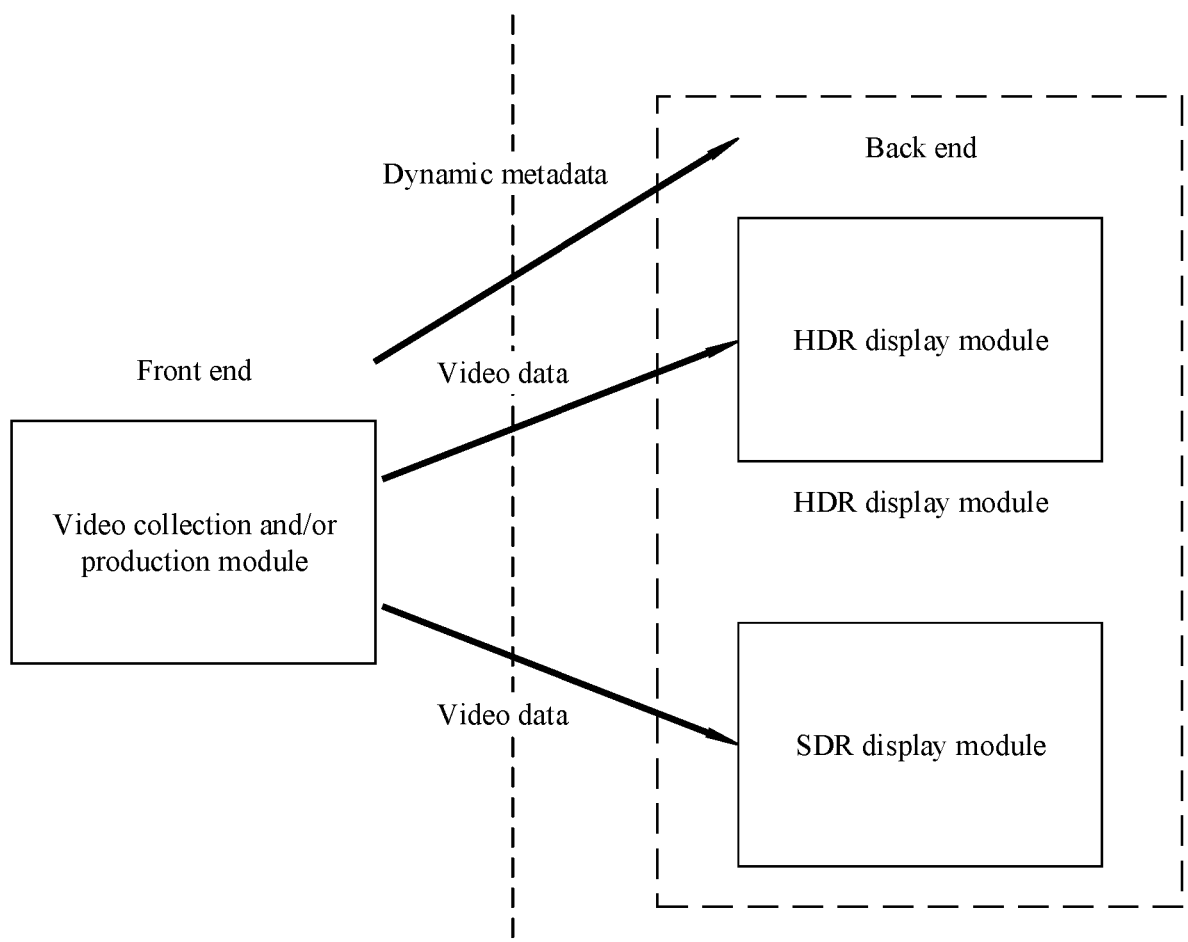
FIG. 8 is a schematic block diagram of an example of a video processing system to which an embodiment of this application is applied.

The following describes a system architecture to which an embodiment of this application is applied. FIG. 8 is a schematic block diagram of an example of a video processing system to which an embodiment of this application is applied. As shown in FIG. 8, the video processing system is divided into a front end and a back end. The front end includes a video collection and/or production module, and the back end includes an HDR display module and/or an SDR display module. The front end preprocesses collected video data and transmits preprocessed data to the back end. In addition, the front end carries dynamic metadata of the video data. The back end performs enhancement processing on an image frame in the video based on the video data in combination with the corresponding dynamic metadata, to obtain an image with an excellent color, excellent luminance, an excellent contrast, and the like; and displays the image.

In this application, the front end and the back end may be different physical devices independent of each other. For example, the front end may be a device having a video capture function, for example, a video camera, a camera, or an image drawing machine; the back end may be a device having a video playback function, for example, a mobile phone, a tablet, a set-top box, or a television. In this case, a wireless connection or a wired connection may be established between the front end and the back end. The wireless connection may use technologies such as long term evolution (LTE), 5th generation (5G) mobile communication, and future mobile communication. The wireless connection may further include technologies such as wireless fidelity (Wi-Fi), Bluetooth, and near field communication (NFC). The wired connection may include an Ethernet connection, a local area network connection, and the like. This is not specifically limited. In this application, functions of the front end and functions of the back end may be further integrated into a same physical device, for example, a mobile phone, a tablet, a set-top box, a television, or an image drawing machine that has a video shooting function. In this application, a part of functions of the front end and a part of functions of the back end may be alternatively integrated into a same physical device. This is not specifically limited.

The foregoing device integrating the functions of the front end and the functions of the back end may be deployed on land, including indoor or outdoor, handheld, or in-vehicle; or may be deployed on the water (for example, on a ship); or may be deployed in the air (for example, on an airplane, a balloon, or a satellite). The terminal device may be a mobile phone, a tablet computer, a wearable device having a wireless communication function (for example, a smartwatch), a location tracker having a locating function, a computer having a wireless sending/receiving function, a virtual reality (VR) device, an augmented reality (AR) device, a wireless device in industrial control, a wireless device in self driving, a wireless device in remote medical, a wireless device in smart grid, a wireless device in transportation safety, a wireless device in smart city, a wireless device in smart home, or the like. This is not limited in this application.

Figure 9:
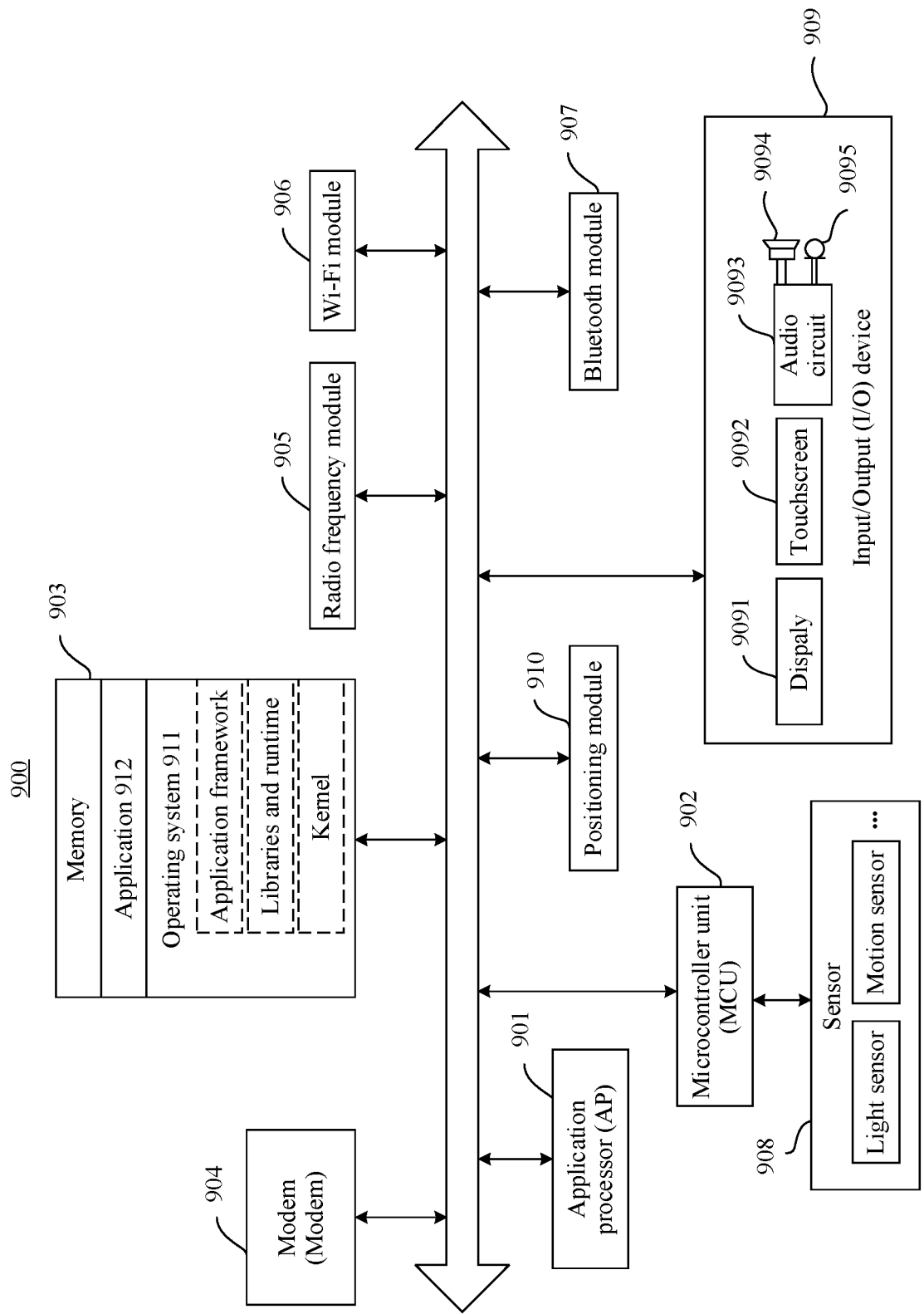
FIG. 9 is a schematic diagram of an example of a structure of a terminal device 900.

FIG. 9 is a schematic diagram of an example of a structure of a terminal device 900. As shown in FIG. 9, the terminal device 900 includes components such as an application processor 901, a microcontroller unit (MCU) 902, a memory 903, a modem 904, a radio frequency (RF) module 905, a wireless fidelity (Wi-Fi) module 906, a Bluetooth module 907, a sensor 908, an input/output (I/O) device 909, and a positioning module 910. These components can communicate with each other through one or more communication buses or signal cables. The communication bus or the signal cable may be a CAN bus provided in this application. A person skilled in the art may understand that, the terminal device 900 may include more or fewer components than those shown in the diagram, or some components may be combined, or the components may be disposed in a different manner.

The following specifically describes the components of the terminal device 900 with reference to FIG. 9.

The application processor 901 is a control center of the terminal device 900, and is connected to the components of the terminal device 900 through various interfaces and buses. In some embodiments, the processor 901 may include one or more processing units.

The memory 903 stores computer programs such as an operating system 911 and an application 912 shown in FIG. 9. The application processor 901 is configured to execute the computer programs in the memory 903, to implement functions defined by the computer programs. For example, the application processor 901 executes the operating system 911 to implement various functions of the operating system on the terminal device 900. The memory 903 further stores data other than the computer programs, for example, data generated during running of the operating system 911 and the application 912. The memory 903 is a non-volatile storage medium, and generally includes an internal memory and an external memory. The internal memory includes, but is not limited to, a random access memory (RAM), a read-only memory (ROM), a cache, or the like. The external memory includes, but is not limited to, a flash memory, a hard disk, a compact disc, a universal serial bus (USB) flash drive, or the like. The computer programs are usually stored in the external memory. Before executing the computer programs, the processor loads the programs from the external memory to the internal memory.

The memory 903 may be independent, and is connected to the application processor 901 through a bus. Alternatively, the memory 903 and the application processor 901 may be integrated into a chip subsystem.

The MCU 902 is a coprocessor configured to obtain and process data from the sensor 908. The MCU 902 has a weaker processing capability and lower power consumption than those of the application processor 901, but has a feature of "always on", and can continuously collect and process sensor data when the application processor 901 is in a sleep mode, to ensure normal running of the sensor with extremely low power consumption. In an embodiment, the MCU 902 may be a sensor hub chip. The sensor 908 may include a light sensor and a motion sensor. Specifically, the light sensor may include an ambient light sensor and a proximity sensor. The ambient light sensor may adjust luminance of a display 9091 based on brightness of ambient light. The proximity sensor may power off the display screen when the terminal device 900 approaches an ear. As a type of motion sensor, an accelerometer sensor may detect values of acceleration in various directions (generally three axes), and may detect a value and a direction of gravity when the accelerometer sensor is in a still state. The sensor 908 may further include another sensor, for example, a gyroscope, a barometer, a hygrometer, a thermometer, or an infrared sensor. Details are not described herein. The MCU 902 and the sensor 908 may be integrated into a same chip, or may be separate components connected through a bus.

The modem 904 and the radio frequency module 905 constitute a communication subsystem of the terminal device 900, and are configured to implement main functions in a wireless communication standard protocol. The modem 904 is configured to perform encoding/decoding, signal modulation/demodulation, equalization, and the like. The radio frequency module 905 is configured to receive and send a radio signal. The radio frequency module 905 includes, but is not limited to, an antenna, at least one amplifier, a coupler, a duplexer, and the like. The radio frequency module 905 cooperates with the modem 904 to implement a wireless communication function. The modem 904 may serve as an independent chip, or may be combined with another chip or circuit to form a system-level chip or an integrated circuit. These chips or integrated circuits may be applied to all terminal devices that implement the wireless communication function, including a mobile phone, a computer, a notebook computer, a tablet computer, a router, a wearable device, a vehicle, a home appliance, and the like.

The terminal device 900 may further perform wireless communication by using the Wi-Fi module 906, the Bluetooth module 907, or the like. The Wi-Fi module 906 is configured to provide, to the terminal device 900, network access that complies with a Wi-Fi related standard protocol. The terminal device 900 may access a Wi-Fi access point by using the Wi-Fi module 906, to access the Internet. In some other embodiments, the Wi-Fi module 906 may alternatively serve as a Wi-Fi wireless access point, and may provide Wi-Fi network access to another terminal device. The Bluetooth module 907 is configured to implement short-range communication between the terminal device 900 and another terminal device (for example, a mobile phone or a smartwatch). The Wi-Fi module 906 in this embodiment of this application may be an integrated circuit, a Wi-Fi chip, or the like. The Bluetooth module 907 may be an integrated circuit, a Bluetooth chip, or the like.

The positioning module 910 is configured to determine a geographical location of the terminal device 900. It may be understood that the positioning module 910 may be specifically a receiver of a positioning system, for example, a global positioning system (GPS), a BeiDou navigation satellite system, or a Russian GLONASS.

The Wi-Fi module 906, the Bluetooth module 907, and the positioning module 910 may be independent chips or integrated circuits, or may be integrated together. For example, in an embodiment, the Wi-Fi module 906, the Bluetooth module 907, and the positioning module 910 may be integrated into a same chip. In another embodiment, the Wi-Fi module 906, the Bluetooth module 907, the positioning module 910, and the MCU 902 may alternatively be integrated into a same chip.

The input/output device 909 includes, but is not limited to, the display 9091, a touchscreen 9092, an audio circuit 9093, and the like.

The touchscreen 9092 may collect a touch event of a user of the terminal device 900 on or near the touchscreen 9092 (for example, an operation performed by the user on or near the touchscreen 9092 by using a finger or any suitable object, for example, a stylus), and sends the collected touch event to another component (for example, the application processor 901). The operation performed by the user near the touchscreen 9092 may be referred to as a floating touch. Through the floating touch, the user may select, move, or drag a target (for example, an icon) without directly touching the touchscreen 9092. In addition, the touchscreen 9092 may be implemented by using a plurality of types such as a resistive type, a capacitive type, an infrared type, and a surface acoustic wave type.

The display (also referred to as a display screen) 9091 is configured to display information entered by the user or information displayed to the user. The display 9091 may be configured in a form, for example, a liquid crystal display or an organic light-emitting diode. The touchscreen 9092 may cover the display 9091. After detecting a touch event, the touchscreen 9092 transmits the touch event to the application processor 901 to determine a type of the touch event. Then, the application processor 901 may provide corresponding visual output on the display 9091 based on the type of the touch event. In FIG. 9, the touchscreen 9092 and the display 9091 serve as two independent components to implement input and output functions of the terminal device 900. However, in some embodiments, the touchscreen 9092 and the display 9091 may be integrated to implement the input and output functions of the terminal device 900. In addition, the touchscreen 9092 and the display 9091 may be disposed on the front side of the terminal device 900 in a full panel form, to implement a bezel-less structure.

The audio circuit 9093, a speaker 9094, and a microphone 9095 may provide an audio interface between the user and the terminal device 900. The audio circuit 9093 may transmit, to the speaker 9094, an electrical signal into which received audio data is converted. The speaker 9094 converts the electrical signal into a sound signal for output. In addition, the microphone 9095 converts a collected sound signal into an electrical signal, the audio circuit 9093 receives the electrical signal, converts the electrical signal into audio data, and then sends the audio data to, for example, another terminal device by using the modem 904 and the radio frequency module 905, or outputs the audio data to the memory 903 for further processing.

In addition, the terminal device 900 may further have a fingerprint recognition function. For example, a fingerprint collection component may be configured on the back side of the terminal device 900 (for example, the lower part of a rear-facing camera), or a fingerprint collection component may be configured on the front side of the terminal device 900 (for example, the lower part of the touchscreen 9092). For another example, a fingerprint collection component may be configured in the touchscreen 9092 to implement the fingerprint recognition function. To be specific, the fingerprint collection component may be integrated with the touchscreen 9092 to implement the fingerprint recognition function of the terminal device 900. In this case, the fingerprint collection component is configured in the touchscreen 9092, and may be a part of the touchscreen 9092 or may be configured in the touchscreen 9092 in another manner. A main part of the fingerprint collection component in this embodiment of this application is a fingerprint sensor. The fingerprint sensor may use any type of sensing technology, including but not limited to an optical sensing technology, a capacitive sensing technology, a piezoelectric sensing technology, an ultrasonic wave sensing technology, or the like.

Further, the operating system 911 carried in the terminal device 900 may be iOS®, Android®, Microsoft®, or another operating system. This is not limited in this embodiment of this application.

The terminal device 900 carrying the Android® operating system is used as an example. The terminal device 900 may be logically divided into a hardware layer, the operating system 911, and an application layer. The hardware layer includes hardware resources such as the foregoing application processor 901, MCU 902, memory 903, modem 904, Wi-Fi module 906, sensor 908, and positioning module 910. The application layer includes one or more applications, for example, the application 912. The application 912 may be an application of any type, for example, a social application, an e-commerce application, or a browser. The operating system 911 serves as software middleware between the hardware layer and the application layer, and is a computer program for managing and controlling hardware and software resources.

In an embodiment, the operating system 911 includes a kernel, a hardware abstraction layer (HAL), libraries and runtime, and a framework. The kernel is configured to provide an underlying system component and service, for example, power management, memory management, thread management, and a hardware driver. The hardware driver includes a Wi-Fi driver, a sensor driver, a positioning module driver, and the like. The hardware abstraction layer encapsulates a kernel driver program, provides an interface to the framework, and shields an underlying embodiment detail. The hardware abstraction layer is run in user space, and the kernel driver program is run in kernel space.

The libraries and runtime is also referred to as a runtime library, and provides a library file and an execution environment that are required when an executable program is run. In an embodiment, the libraries and runtime include Android runtime (ART), a library, and a scenario package runtime. The ART is a virtual machine or a virtual machine instance that can convert bytecode of an application into machine code. The library is a program library that provides support to the executable program during running, and includes a browser engine (such as a webkit), a script execution engine (for example, a JavaScript engine), a graphics processing engine, and the like. The scenario package runtime is a running environment of a scenario package, and mainly includes a page execution environment and a script execution environment. The page execution environment invokes a corresponding library to parse page code in an HTML, CSS, or another format, and the script execution environment invokes a corresponding function library to parse and execute code or an executable file implemented by a script language such as JavaScript.

The framework is configured to provide various basic common components and services such as window management and location management for the application program in the application layer. In an embodiment, the framework includes a geofence service, a policy service, a notification manager, and the like.

All functions of the components in the operating system 911 described above may be implemented by the application processor 901 by executing the program stored in the memory 903.

A person skilled in the art may understand that the terminal device 900 may include fewer or more components than those shown in FIG. 9, and the terminal device shown in FIG. 9 includes only components more related to a plurality of embodiments disclosed in this application.

The following describes in detail the solutions in embodiments of this application.

Figure 10:
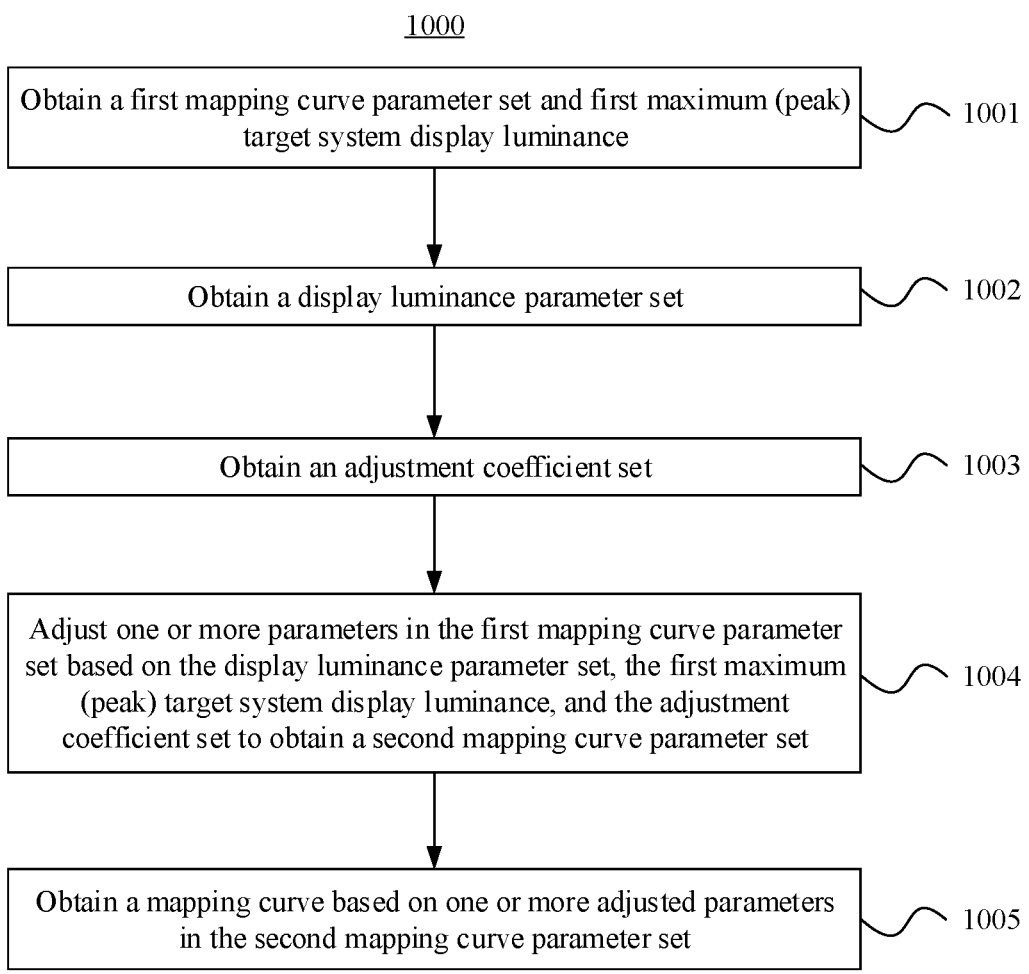
FIG. 10 is a flowchart of an embodiment of a mapping curve parameter obtaining method according to this application.

FIG. 10 is a flowchart of an embodiment of a mapping curve parameter obtaining method according to this application. As shown in FIG. 10, the process 1000 may be applied to the video processing system shown in FIG. 8, or may be applied to the terminal device shown in FIG. 9. An execution body of the process 1000 includes the terminal device or the back end in the video processing system. The process 1000 is described as a series of operations or operations. It should be understood that the operations or operations of the process 1000 may be performed in various sequences and/or may be performed simultaneously, but are not limited to an execution sequence shown in FIG. 10. The mapping curve parameter obtaining method in this application includes the following operations.

Operation 1001: Obtain a first mapping curve parameter set and first maximum target system display luminance.

In this application, a front end may be the front end in the video processing system shown in FIG. 8, and a back end may be the back end in the video processing system shown in FIG. 8. In this case, data from the front end may be transmitted to the back end by using a wireless network or a wired network. Alternatively, the front end and the back end may be integrated into the terminal device shown in FIG. 9. In this case, data of the front end may be transmitted to the back end by using a transmission path inside the terminal device, for example, a controller area network (CAN) bus. After receiving the data, the back end can store the data in a buffer for subsequent processing. The buffer may be, for example, an RGB color gamut pixel buffer of the to-be-processed frame and/or a metadata buffer of the to-be-processed frame.

After obtaining the video, the front end may preprocess the video, for example, map, by using an optical-electro transfer function, luminance in the real world to luminance matching a storage mode; adjust luminance, chrominance, a contrast, and the like of the video based on obtained information; and encode the video to generate a bitstream. The front end sends processed data to the back end.

The data from the front end may include video data (also referred to as data of to-be-displayed content) and dynamic metadata. The video data may be data related to an image frame in the video, for example, pixel data. The dynamic metadata may include data related to the video data and data related to a mapping curve. The data related to the video data may include a format and a feature of the video data such as storable first maximum target system display luminance (targeted_system_display_maximum_luminance), and storable maximum luminance MaxSource, storable minimum luminance MinSource, storable average luminance AvgSource, or a storable variation range of the video in the memory. A principle of the storable variation range is similar to that of a variance or a distribution confidence interval, and the variation range is used to describe a luminance aggregation range of a video signal. The data related to the mapping curve may include parameters related to the mapping curve, such as a scaling factor, an offset factor, and a bending shape factor. The first mapping curve parameter set includes one or more parameters in the data related to the mapping curve. For example, data related to an S-shaped curve includes eight parameters: a, b, p, n, m, $k_1$, $k_2$, and $k_3$, and the first mapping curve parameter set may include all the eight parameters, or may include only a part of the eight parameters, where the part of the parameters each are a rational number.

Optionally, the data related to the video data may alternatively be directly extracted from the video content without transmission based on dynamic metadata.

The first mapping curve parameter set corresponds to the first maximum target system display luminance, that is, one or more parameters in the first mapping curve parameter set are generated by using the first maximum target system display luminance as a target, or are related to the first maximum target system display luminance. The front end may include the first mapping curve parameter set and the first maximum target system display luminance in the dynamic metadata. Alternatively, only the first mapping curve parameter set may be carried in the dynamic metadata; in this case, the first mapping curve parameter set corresponds to default maximum target system display luminance, and the front end and the back end agree on the default maximum target system display luminance in advance. In this way, after receiving the first mapping curve parameter set, the back end can learn of the first maximum target system display luminance by default, provided that the front end includes the dynamic metadata in the first mapping curve parameter set corresponding to the dynamic metadata. If the back end needs to adjust the peak target system display luminance based on an actual situation, the one or more parameters in the first mapping curve parameter set may be adjusted based on a relationship between actual luminance and the default peak target system display luminance to obtain a new mapping curve parameter set corresponding to the actual luminance.

It should be noted that content included in the video data and a data form are not specifically limited in this application. For example, in terms of color space of the pixel data, a format of the video data may be YUV, or may be RGB. In terms of a bit width of the data, the video data may include 8 bits, 10 bits, 12 bits, or the like. Content included in the dynamic metadata is not specifically limited, either. For example, the data related to the mapping curve may be the parameter related to the foregoing sigmoid curve, the parameter related to the foregoing Bezier curve, or the parameter related to the S-shaped curve.

Operation 1002: Obtain a display luminance parameter set.

In this application, the display luminance parameter set may be obtained based on device information. The display luminance parameter set includes maximum display luminance (MaxDisplay) and/or minimum display luminance (MinDisplay) of a display device. The device information may be a parameter of the device that is written into the device before delivery, or may be information provided by a manufacturer. The device information indicates an attribute and performance of the device.

The maximum display luminance refers to maximum illuminance that can be presented by the device during displaying. The minimum display luminance refers to minimum illuminance that can be presented by the device during displaying. The minimum display luminance is usually set to 0 cd/m² or 1 cd/m². The minimum display luminance may alternatively be set to another value based on display performance of the device. This is not specifically limited in this application.

Operation 1003: Obtain an adjustment coefficient set.

The adjustment coefficient set includes information indicating that one or more parameters related to the mapping curve need to be adjusted.

The adjustment coefficient set includes one or more adjustment coefficients, and the one or more adjustment coefficients correspond to the one or more parameters in the first mapping curve parameter set. As described above, the first mapping curve parameter set includes the one or more parameters related to the mapping curve, and one adjustment coefficient in the adjustment coefficient set may correspond to one parameter in the first mapping curve parameter set, that is, each parameter related to the mapping curve corresponds to one adjustment coefficient. In addition, one adjustment coefficient in the adjustment coefficient set may alternatively correspond to a plurality of parameters in the first mapping curve parameter set, that is, each adjustment coefficient corresponds to a plurality of parameters related to the mapping curve. Alternatively, the adjustment coefficient set may include no adjustment coefficient corresponding to the one or more parameters in the first mapping curve parameter set, that is, one or more parameters related to the mapping curve in the first mapping curve parameter set does not correspond to any adjustment coefficient in the adjustment coefficient set. In this case, it indicates that the parameters do not need to be adjusted. The first mapping curve parameter set may alternatively include a parameter that does not correspond to any adjustment coefficient in the adjustment coefficient set, that is, one or more adjustment coefficients does not correspond to any parameter in the first mapping curve parameter set. In this case, it indicates that the front end does not send the parameter to the back end at this time, but needs to adjust the parameter. The back end can obtain the parameter by using another method.

In this application, the device may obtain the adjustment coefficient set from the dynamic metadata. Before sending the bitstream, the front end has set a manner of adjusting the one or more parameters related to the mapping curve, and may write the adjustment manner into dynamic metadata and send the dynamic metadata to the back end; or the device obtains the adjustment coefficient set based on a preset value. The preset value may correspond to the one or more parameters related to the mapping curve, or may be an adjustment mode index. The device obtains, based on the index, an adjustment coefficient that is of the one or more parameters related to the mapping curve and that corresponds to the preset value.

Operation 1004: Adjust the one or more parameters in the first mapping curve parameter set based on the display luminance parameter set, the first maximum target system display luminance, and the adjustment coefficient set to obtain a second mapping curve parameter set.

The second mapping curve parameter set includes one or more adjusted parameters, and the one or more adjusted parameters correspond to the one or more parameters in the first mapping curve parameter set, and are obtained by adjusting the one or more parameters in the first mapping curve parameter set. It should be noted that the parameters included in the second mapping curve parameter set may one-to-one correspond to the parameters included in the first mapping curve parameter set. That is, each parameter included in the first mapping curve parameter set is added to the second mapping curve parameter set after being adjusted. This is applicable to a case that the first mapping curve parameter set includes all of the parameters related to the mapping curve. The parameters included in the second mapping curve parameter set may alternatively be parameters that are not included in the first mapping curve parameter set. That is, each parameter included in the first mapping curve parameter set is added to the second mapping curve parameter set after being adjusted, another part of parameters are obtained by the device by using another method, and then, this part of parameters are added to the second mapping curve parameter set after or without being adjusted. This is applicable to a case that the first mapping curve parameter set includes a part of parameters related to the mapping curve. In addition, data included in the second mapping curve parameter set may alternatively be a set of an adjusted first mapping curve parameter and an unadjusted first mapping curve parameter.

The following uses a first parameter as an example to describe a method for obtaining the second mapping curve parameter set in this application. The first parameter is any parameter in the first mapping curve parameter set.

Method 1: Calculate an adjusted first parameter according to formula (1):

$$P_a = P_b + k \times P_\Delta \tag{1}$$

where $P_a$ represents the adjusted first parameter, $P_b$ represents the first parameter, $P_\Delta$ represents an adjustment coefficient corresponding to the first parameter, and $$k = \left(\frac{MaxDisplay - M_{TPL}}{M}\right)^N$$

or $$k = a \times \left(\frac{|MaxDisplay - M_{TPL}|}{M}\right)^N,$$

where $a=1$ when MaxDisplay$>M_{TPL}$, or $a=-1$ when MaxDisplay$\leq M_{TPL}$; MaxDisplay represents the maximum display luminance; $M_{TPL}$ represents the first maximum target system display luminance; N represents an adjustment control parameter, and is a rational number greater than 0, for example, may be 1 or 2; and M represents a preset luminance value, and is a rational number greater than 0, for example, may be 100 cd/m² or 50 cd/m². It may usually be set that M=1 and N=100 cd/m². Both M and N are used to control a variation speed of the parameters related to the mapping curve. It should be noted that, to adapt to hardware from different vendors, different content scenarios, and the like, one or both of M and N may be used as parameters and transferred based on the dynamic metadata. This is also true for the following method, and details are not described again.

It should be noted that a value of MaxDisplay in this application may be an absolute luminance value, for example, 100 cd/m² or 1000 cd/m²; a value of MaxDisplay may be a normalized luminance value, and a value range thereof is 0-1; or a value of MaxDisplay may be a luminance value in a PQ domain, for example, 0-10000 cd/m². In this application, a value of $M_{TPL}$ may be an absolute luminance value, for example, 100 cd/m² or 1000 cd/m²; a value of $M_{TPL}$ may be a normalized luminance value, and a value range of $M_{TPL}$ is 0-1; or a value of $M_{TPL}$ may be a luminance value in a PQ domain, for example, 0-10000 cd/m². In this application, a value of M may be an absolute luminance value, for example, 100 cd/m² or 1000 cd/m²; a value of M may be a normalized luminance value, and a value range of M is 0-1; or a value of M may be a luminance value in a PQ domain, for example, 0-10000 cd/m². This is not specifically limited in this application. This is also true for the following method, and details are not described again.

All or a part of the parameters in the first mapping curve parameter set may be adjusted according to the foregoing formula (1), to obtain adjusted parameters added to the second mapping curve parameter set.

Method 2: Calculate an adjusted first parameter according to formula (2):

$$P_a = (1-w) \times P_b + w \times P_m \qquad (2)$$

where $P_a$ represents the adjusted first parameter, $P_b$ represents a first parameter, and $$w = P_\Delta \times \left( \frac{MaxDisplay - M_{TPL}}{M} \right)^N$$

or $$w = P_\Delta \times \left( \frac{|MaxDisplay - M_{TPL}|}{M} \right)^N,$$

where $P_\Delta$ represents an adjustment coefficient corresponding to the first parameter; MaxDisplay represents the maximum display luminance; $M_{TPL}$ represents the first maximum target system display luminance; N represents an adjustment control parameter, and is a rational number greater than 0, for example, may be 1 or 2; M represents a preset luminance value, and is a rational number greater than 0, for example, may be 100 cd/m² or 50 cd/m²; and $P_m$ represents an intermediate value of the first parameter obtained based on one or more of parameters such as maximum display luminance, the minimum display luminance, the storable maximum luminance, the storable minimum luminance, the storable average value, and the storable variation range.

It should be noted that $P_m$ may also be obtained based on more or fewer parameters than the foregoing maximum display luminance, minimum display luminance, storable maximum luminance, storable minimum luminance, storable average value, and/or storable variation range. This is not specifically limited in this application. This is also true for the following method, and details are not described again. For obtaining $P_m$ in this application, refer to a mapping curve generation method in a related technology. This is not specifically limited in this application.

It should be noted that, in method 2, the device may obtain, based on the following parameters, another parameter set related to the mapping curve: the data related to the video data such as the storable maximum luminance, minimum luminance, average luminance, and/or variation range of the video in the memory; the maximum display luminance of the device; the minimum display luminance of the device; and/or another parameter that is not directly related to the mapping curve. Parameters in the parameter set one-to-one correspond to parameters in the first mapping curve parameter set, or the parameter set may include a parameter that does not exist in the first mapping curve parameter set. In this way, the device may obtain two parameter sets related to the mapping curve. One of the sets comes from the front end, and the other set is obtained by the device through calculation based on the features of the video data. Then, the two parameter sets are fused by using a weighting method to obtain a final parameter set. In this way, a more flexible brightness processing method may be used at different locations of the video by adjusting weights of the two parameter sets, to obtain a video that better satisfies display performance of the device.

In addition, a method for calculation $P_m$ may be further applied to a parameter that is related to the mapping curve but is not included in the first mapping curve parameter set. A manner in which the foregoing device obtains the parameter by using another method is similar to this method.

In a possible embodiment, the device may obtain a first mapping curve based on the adjusted first parameter and a parameter in the first mapping curve parameter set other than the first parameter, and continue to adjust the first parameter if luminance of the video obtained by performing tone mapping based on the first mapping curve is higher than original luminance of the video. This is to ensure that the mapping curve includes no part higher than a straight line that satisfies x=y.

In a possible embodiment, the adjusted first parameter is analyzed according to a preset rule, and the first parameter continues to be adjusted if the adjusted first parameter complies with the preset rule. For example, $p_a \times r_a > Tp_a$, where $p_a$ is the first parameter, $r_a$ is a scaling factor, and $Tp_a$ is a specified threshold, for example, 3.2363. In this case, $p_a$ is adjusted to an upper limit value Tp, where $Tp=Tp_a/r_a$. Alternatively, a preset table (Ta, Tp) may be searched for Tp corresponding to $r_a$, and $p_a$ is adjusted to an upper limit value Tp if $p_a > Tp$. It should be noted that, if the same value cannot be found through table lookup, a queried value may be determined based on a neighbor value or a weighted average of a neighbor value or in another manner. The foregoing two inequalities indicate that the mapping curve obtained based on the current parameter set related to the mapping curve includes a part higher than the straight line that satisfies x=y. Therefore, dimension reduction processing needs to be performed on a corresponding parameter. It should be noted that, in addition to the foregoing two methods, another method may be used in this application to ensure that the mapping curve includes no part higher than the straight line that satisfies x=y. This is not specifically limited.

In a possible embodiment, when the first mapping curve parameter set includes a scaling factor, an adjusted scaling factor is calculated according to formula (3):

$$r_a = \frac{MaxDisplay}{f(MaxSource, P1_a, P2_a, \ldots)} \quad (3)$$

where $r_a$ represents the adjusted scaling factor; $P1_a$, $P2_a$, ... represents a parameter in the second mapping curve parameter set; MaxSource represents maximum luminance of the video in a memory; $f(MaxSource, P1_a, P2_a, \ldots)$ represents function calculation that is related to the storable maximum luminance of the video in the memory and one or more adjusted parameters in the second mapping curve parameter set, where the function includes a part related to a tone mapping function parameter; and MaxDisplay represents the maximum display luminance. A storable value is related to a storage mode of the memory. For example, if a 10-bit mode is used for storage, a storable maximum value in the memory is $2^{10}$, that is, 1024, and a storable minimum value in the memory is 0. If an 8-bit mode is used for storage, a storable maximum value in the memory is $2^8$, that is, 256, and a storable minimum value in the memory is 0.

If the scaling factor is included during obtaining of the mapping curve, the device may calculate the scaling factor based on the obtained one or more adjusted parameters in the second mapping curve parameter set and according to formula (3). In this way, the scaling factor is obtained based on the adjusted parameters, and therefore the finally generated mapping curve better satisfies the features of the video. The scaling factor determines a scaling degree of a linear signal value of a pixel of an image frame in the mapping curve formula. For example, in the formula $$L' = F(L) = a \times \left( \frac{p \times L^n}{(k_1 \times p - k_2)L^n + k_3} \right)^m + b,$$

a is the scaling factor.

In a possible embodiment, when the first mapping curve parameter set includes a scaling factor, an adjusted scaling factor is calculated according to formula (4):

$$r_a = \frac{MaxDisplay - MinDisplay}{f(MaxSource, P1_a, P2_a, \ldots) - f(MinSource, P1_a, P2_a, \ldots)} \quad (4)$$

where $r_a$ represents the adjusted scaling factor, $P1_a$, $P2_a$, ... represents a parameter in the second mapping curve parameter set, MaxSource represents storable maximum luminance of the video in a memory, MinSource represents storable minimum luminance of the video in the memory, $f(MaxSource, P1_a, P2_a, \ldots)$ represents function calculation that is related to the storable maximum luminance of the video in the memory and one or more adjusted parameters in the second mapping curve parameter set, $f(MinSource, P1_a, P2_a, \ldots)$ represents function calculation that is related to the storable minimum luminance of the video in the memory and one or more adjusted parameters in the second mapping curve parameter set, MaxDisplay represents the maximum display luminance, and MinDisplay represents the minimum display luminance.

In a possible embodiment, when the first mapping curve parameter set includes a scaling factor, an adjusted scaling factor is calculated according to formula (5):

$$r_a = \frac{MaxDisplay - MinDisplay}{f(MaxSource, P1_a, P2_a, \ldots)} \quad (5)$$

where $r_a$ represents the adjusted scaling factor, $P1_a$, $P2_a$, ... represents a parameter in the second mapping curve parameter set, MaxSource represents storable maximum luminance of the video in a memory, $f(MaxSource, P1_a, P2_a, \ldots)$ represents function calculation that is related to the storable maximum luminance of the video in the memory and one or more adjusted parameters in the second mapping curve parameter set, MaxDisplay represents the maximum display luminance, and MinDisplay represents the minimum display luminance.

In a possible embodiment, when the first mapping curve parameter set includes a scaling factor, an adjusted scaling factor is calculated according to formula (6):

$$r_a = \frac{MaxDisplay}{f(MaxSource, P1_a, P2_a, \ldots) - f(MinSource, P1_a, P2_a, \ldots)} \quad (6)$$

where $r_a$ represents the adjusted scaling factor, $P1_a$, $P2_a$, ... represents a parameter in the second mapping curve parameter set, MaxSource represents storable maximum luminance of the video in a memory, MinSource represents minimum luminance of the video in the memory, $f(MaxSource, P1_a, P2_a, \ldots)$ represents function calculation that is related to the storable maximum luminance of the video in the memory and one or more adjusted parameters in the second mapping curve parameter set, $f(MinSource, P1_a, P2_a, \ldots)$ represents function calculation that is related to the storable minimum luminance of the video in the memory and one or more adjusted parameters in the second mapping curve parameter set, and MaxDisplay represents the maximum display luminance.

In a possible embodiment, when the first mapping curve parameter set includes an offset factor, an adjusted offset factor is determined in the following manner:

$r_a$=MinDisplay, where MinDisplay represents the minimum display luminance; or $r_a$=G, where G represents a preset value, and may be a rational number, for example, 0 or 1.

If the scaling factor is included during obtaining of the mapping curve, the device may calculate the scaling factor based on any one of the obtained one or more adjusted parameters in the second mapping curve parameter set and according to the foregoing formulas. In this way, the scaling factor is obtained based on the adjusted parameter, and therefore the finally generated mapping curve better satisfies the features of the video.

Operation 1005: Obtain the mapping curve based on the one or more adjusted parameters in the second mapping curve parameter set.

Based on the one or more adjusted parameters, the entire mapping curve or a part of the tone mapping curve may be obtained. Calculation of the curve is to obtain mapping from normalized HDR/SDR video data to normalized displayed data, and reversely normalize an obtained mapping value to the actually displayed data of the device based on the maximum display luminance and the minimum display luminance of the device.

It should be noted that the foregoing reverse normalization may be in non-linear space, or may be normalization to 0-1 in linear space. Reverse normalization may be 0-10000 cd/m², or may be 0.001-100000 cd/m². A range and a process of reverse normalization are not specifically limited in this application. In addition, the obtaining the mapping curve includes not only performing tone mapping (tonemapping), but also adjusting the mapped video before the mapped video is displayed, to adjust saturation processing, color gamut transformation processing, denoising processing, sharpening processing, and/or the like of the mapped video. This is not specifically limited in this application.

In this application, the one or more parameters related to the mapping curve are adjusted. In the adjustment process, a display capability of a back end is considered, and therefore more accurate tone adjustment can be performed on display devices with different luminance. This greatly improves flexibility, and also achieves good presentation effect when a curve parameter is appropriately configured.

The following further describes the solution of the method embodiment in FIG. 10 by using several specific embodiments.

Embodiment 1

For an S-shaped curve, dynamic metadata may include statistical values of a video in a memory, such as storable maximum luminance, storable minimum luminance, and storable average luminance; or may include parameters related to the S-shaped curve, such as p, m, a, b, n, K1, K2, and K3.

1: Obtain a first mapping curve parameter set and first maximum target system display luminance.

The dynamic metadata includes a format or a feature of video data such as a first mapping curve parameter set satisfying Mb={$p_b$, $m_b$, $a_b$, $b_b$, $n_b$, $K1_b$, $K2_b$, $K3_b$}, maximum target system display luminance (targeted_system_display_maximum_luminance) $M_{TPL}$, and/or storable maximum luminance MaxSource, storable minimum luminance MinSource, storable average luminance AvgSource, and/or a storable variation range of the video in the memory.

It should be noted that content included in the video data and a data form are not specifically limited in this application. For example, in terms of color space of pixel data, the format of the video data may be YUV, or may be RGB. In terms of a bit width of the data, the video data may include 8 bits, 10 bits, 12 bits, or the like.

2: Obtain a display parameter set of a back end.

The display parameter set may include maximum display luminance MaxDisplay, minimum display luminance MinDisplay, and/or maximum target system display luminance (targeted_system_display_maximum_luminance) $T_{TPL}$ of the back end. The maximum display luminance MaxDisplay may be obtained based on a parameter of a device or information about a manufacturer, and the minimum display luminance MinDisplay may be set to 0 cd/m², 1 cd/m², or a PQ value corresponding to 0 cd/m² or 1 cd/m². The minimum display luminance may alternatively be set to another value based on display performance of the device. This is not specifically limited in this application.

3: Obtain an adjustment coefficient set.

Corresponding to the foregoing first mapping curve parameter set Mb, the adjustment coefficient set $M_A$ may be a subset or a full set of {$p_A$, $m_A$, $a_A$, $b_A$, $n_A$, $K1_A$, $K2_A$, and $K3_A$}. Generally, the adjustment coefficient set may be obtained based on metadata, or may be preset.

4: Adjust one or more parameters in the first mapping curve parameter set based on local maximum display luminance, the first maximum target system display luminance, and the adjustment coefficient set to obtain a second mapping curve parameter set.

One or more parameters in the first mapping curve parameter set satisfying Mb={$p_b$, $m_b$, $a_b$, $b_b$, $n_b$, $K1_b$, $K2_b$, $K3_b$} are adjusted to obtain an adjusted second mapping curve parameter set satisfying Ma={$p_a$, $m_a$, $a_a$, $b_a$, $n_a$, $K1_a$, $K2_a$, $K3_a$}. Main operations are as follows:

A: Traverse the first mapping curve parameter set satisfying Mb={$p_b$, $m_b$, $a_b$, $b_b$, $n_b$, $K1_b$, $K2_b$, $K3_b$} for a parameter $Q_b$ ($Q_b$ is any parameter in Mb). If the adjustment coefficient set $M_A$ includes a corresponding adjustment coefficient $Q_A$, $Q_a = Q_b + k \times Q_A$; otherwise, $Q_a = Q_b$.

$$k = \left(\frac{MaxDisplay - M_{TPL}}{M}\right)^N$$

or $$k = a \times \left(\frac{|MaxDisplay - M_{TPL}|}{M}\right)^N,$$

where a=1 when MaxDisplay>$M_{TPL}$, or a=−1 when MaxDisplay≤$M_{TPL}$; M is a preset luminance value, and is a rational number greater than 0, for example, 100 cd/m², 50 cd/m², or a PQ value corresponding to 100 cd/m²; and N is an adjustment control parameter, and is a rational number greater than 0, for example, 1 or 2.

B: Set $b_a$ = MinDisplay or $b_a$ = 0.

C: Set $a_a = a_b \times \dfrac{MaxDisplay}{M_{TPL}}$

D: Limit $p_a$ to Tp if a mapping curve obtained based on the current second mapping curve parameter set includes a part higher than a straight line that satisfies x=y. Main methods are as follows:

If $p_a \times a_a > Tp_a$, it is considered that the mapping curve includes the part higher than the straight line that satisfies x=y, where $Tp_a$ is a preset value, and Tp=$Tp_a$/$a_a$; or a preset table (Ta, Tp) is searched for Tp corresponding to $a_a$, and $p_a$ is adjusted to an upper limit value Tp if $P_a$>Tp. It should be noted that, if the same value cannot be found through table lookup, a queried value may be determined based on a neighbor value or a weighted average of a neighbor value or in another manner.

In this case, the scaling factor aa is calculated according to the following formula:

$$a_a = \frac{MaxDisplay - MinDisplay}{\left(\dfrac{P_a \times L^{n_a}}{(K1_a \times p_a - K2_a) \times L^{n_a} + K3_a}\right)^{m_a}},$$

$$a_a = \frac{MaxDisplay}{\left(\dfrac{p_a \times L^{n_a}}{(K1_a \times p_a - K2_a) \times L^{n_a} + K3_a}\right)^{m_a}}, \text{ or}$$

$$a_a = \frac{MaxDisplay - MinDisplay}{\left(\dfrac{p_a \times L^{n_a}}{(K1_a \times p_a - K2_a) \times L^{n_a} + K3_a}\right)^{m_a} - \left(\dfrac{p_a \times L1^{n_a}}{(K1_a \times p_a - K2_a) \times L1^{n_a} + K3_a}\right)^{m_a}}.$$

L = MaxSource, and L1 = MinSource.

Calculation of $a_a$ is also true for the following method, and details are not described again.

5: Obtain the mapping curve based on one or more adjusted parameters in the second mapping curve parameter set. A process of obtaining the mapping curve is essentially a process of obtaining the normalized optical or electrical signal based on the foregoing parameter set.

For function calculation related to the one or more adjusted parameters in the second mapping curve parameter set that are obtained based on the one or more adjusted parameters in the second mapping curve parameter set, the mapping curve may be obtained according to the following formula:

$$L' = F(L) = a \times \left(\frac{p \times L^n}{(K1 \times p - K2) \times L^n + K3}\right)^m + b,$$

$$L' = F(L) = a \times \left(\frac{p \times L^n}{(K1 \times p - K2) \times L^n + K3}\right)^m,$$

$$L' = F(L) = \left(\frac{p \times L^n}{(K1 \times p - K2) \times L^n + K3}\right)^m, \text{ or}$$

$$L' = F(L) = \frac{p \times L^n}{(K1 \times p - K2) \times L^n + K3}.$$

Parameters {p, m, a, b, n, K1, K2, and K3} in the formula all come from the second mapping curve parameter set. Each of L and L' is a normalized electrical or optical signal; L' is a rational number with a value range of 0.0-1.0; L is a rational number with a value range of 0.0-1.0; a value range of a is 0.0-1.0; a value range of b is 0.0-1.0; value ranges of p, n, and m are 0.1-N; N is a rational number greater than 0.1; and k1, k2, and k3 are rational numbers. Calculation of L' is also true for the following method, and details are not described again.

It should be noted that all of the foregoing four formulas may be used to obtain the mapping curve, but a difference lies in the one or more adjusted parameters that are related to the mapping curve and that are in the second mapping curve parameter set. The mapping curve obtained according to the formula may be the entire curve, or may be a segment or a part of a segmented mapping curve.

Embodiment 2

For an S-shaped curve, dynamic metadata may include statistical values of a video in a memory, such as storable maximum luminance, storable minimum luminance, storable average luminance, and a storable variation range; or may include parameters related to the S-shaped curve, such as p, m, a, b, n, K1, K2, and K3.

1: Obtain a first mapping curve parameter set and first maximum target system display luminance.

2: Obtain a display parameter set of a back end.

3: Obtain an adjustment coefficient set.

Technical principles of operations 1 to 3 in Embodiment 2 are respectively similar to those of operations 1 to 3 in Embodiment 1, and details are not described herein again.

4: Adjust one or more parameters in the first mapping curve parameter set based on local maximum display luminance, the first maximum target system display luminance, and the adjustment coefficient set to obtain a second mapping curve parameter set.

One or more parameters in the first mapping curve parameter set satisfying $Mb=\{p_b, m_b, a_b, b_b, n_b, K1_b, K2_b, K3_b\}$ are adjusted to obtain an adjusted second mapping curve parameter set satisfying $Ma=\{p_a, m_a, a_a, b_a, n_a, K1_a, K2_a, K3_a\}$. Main operations are as follows:

A: Obtain, based on the following parameters in the metadata, another parameter set that satisfies $Mm=\{p_m, m_m, a_m, b_m, n_m, K1_m, K2_m, K3_m\}$ and that is related to the mapping curve: maximum display luminance MaxDisplay, minimum display luminance MinDisplay, storable maximum luminance MaxSource, storable minimum luminance MinSource, a storable average value AvgSource, a storable variation range, and/or another parameter that is not directly related to the mapping curve, where one or more parameters in Mm may be used as the parameter $P_m$ in the foregoing Formula (2).

B: Traverse the first mapping curve parameter set satisfying $Mb=\{p_b, m_b, a_b, b_b, n_b, K1_b, K2_b, K3_b\}$ for a parameter $Q_b$ ($Q_b$ is any parameter in Mb). If a corresponding parameter $Q_m$ is found in the parameter set satisfying $Mm=\{p_m, m_m, a_m, b_m, n_m, K1_m, K2_m, \text{and } K3_m\}$, $Q_a=(1-w)Q_b+w\times Q_m$; otherwise, $Q_a=Q_b$.

$$w = P_\Delta \times \left(\frac{MaxDisplay - M_{TPL}}{M}\right)^N \text{ or}$$

$$w = P_\Delta \times \left(\frac{|MaxDisplay - M_{TPL}|}{M}\right)^N;$$

M is a preset luminance value, and is a rational number greater than 0, for example, 100 cd/m², 50 cd/m², or a PQ value corresponding to a linear luminance value, for example, 100 cd/m²; and N is an adjustment control parameter, and is a rational number greater than 0, for example, 1 or 2.

C: Set $b_a$=MinDisplay or $b_a$=0.

D: For a calculation formula of the scaling factor aa, refer to Embodiment 1. Details are not described herein again.

5: Obtain the mapping curve based on one or more adjusted parameters in the second mapping curve parameter set.

A technical principle of operation 5 in Embodiment 2 is similar to that of operation 5 in Embodiment 1, and details are not described herein again.

Embodiment 3

For an S-shaped curve, dynamic metadata may include statistical values of a video in a memory, such as storable maximum luminance, storable minimum luminance, a storable average luminance, and a storable variation range; or may include parameters related to the S-shaped curve, such as p, m, a, b, n, K1, K2, and K3.

1: Obtain a first mapping curve parameter set and first maximum target system display luminance.

2: Obtain a display parameter set of a back end.

3: Obtain an adjustment coefficient set.

Technical principles of operations 1 to 3 in Embodiment 3 are respectively similar to those of operations 1 to 3 in Embodiment 1, and details are not described herein again.

4: Adjust one or more parameters in the first mapping curve parameter set based on local maximum display luminance, the first maximum target system display luminance, and the adjustment coefficient set to obtain a second mapping curve parameter set.

One or more parameters in the first mapping curve parameter set satisfying $Mb=\{p_b, m_b, a_b, b_b, n_b, K1_b, K2_b, K3_b\}$ are adjusted to obtain an adjusted second mapping curve parameter set satisfying $Ma=\{p_a, m_a, a_a, b_a, n_a, K1_a, K2_a, K3_a\}$. Main operations are as follows:

A: Obtain, based on the following parameters in the metadata, another parameter set that satisfies Mm={$p_m$, $m_m$, $a_m$, $b_m$, $n_m$, $K1_m$, $K2_m$, $K3_m$} and that is related to the mapping curve: maximum display luminance MaxDisplay, minimum display luminance MinDisplay, storable maximum luminance MaxSource, storable minimum luminance MinSource, a storable average value AvgSource, a storable variation range, and/or another parameter that is not directly related to the mapping curve, where one or more parameters in Mm may be used as the parameter $P_m$ in the foregoing Formula (2).

B: Traverse the first mapping curve parameter set satisfying Mb={$p_b$, $m_b$, $a_b$, $b_b$, $n_b$, $K1_b$, $K2_b$, $K3_b$} for a parameter $Q_b$ ($Q_b$ is any parameter in Mb). If a corresponding parameter $Q_m$ is found in the parameter set satisfying Mm={$p_m$, $m_m$, $a_m$, $b_m$, $n_m$, $K1_m$, $K2_m$, $K3_m$}, $Q_a = (1-w)Q_b + w \times Q_m$; otherwise, $Q_a = Q_b$.

$$w = P_\Delta \times \left(\frac{MaxDisplay - M_{TPL}}{M}\right)^N$$

or $$w = P_\Delta \times \left(\frac{|MaxDisplay - M_{TPL}|}{M}\right)^N;$$

M is a preset luminance value, and is a rational number greater than 0, for example, 100 cd/m², 50 cd/m², or a PQ value corresponding to 100 cd/m² or 50 cd/m²; and N is an adjustment control parameter, and is a rational number greater than 0, for example, 1 or 2.

C: Set $b_a = MinDisplay$ or $b_a = 0$.

D: Set $a_a = a_b \times \dfrac{MaxDisplay}{M_{TPL}}$ or $a_a = a_b$.

E: Limit $p_a$ to Tp if a mapping curve obtained based on the current second mapping curve parameter set includes a part higher than a straight line that satisfies x=y. Main methods are as follows:

If $p_a \times a_a > Tp_a$, it is considered that the mapping curve includes the part higher than the straight line that satisfies x=y, where $Tp_a$ is a preset value, and $Tp = Tp_a / a_3$; or
 a preset table (Ta, Tp) is searched for Tp corresponding to aa, and $p_a$ is adjusted to an upper limit value Tp if $p_a > Tp$. It should be noted that, if the same value cannot be found through table lookup, a queried value may be determined based on a neighbor value or a weighted average of a neighbor value or in another manner.

For a calculation formula of the scaling factor aa, refer to Embodiment 1. Details are not described herein again.

5: Obtain the mapping curve based on one or more adjusted parameters in the second mapping curve parameter set.

A technical principle of operation 5 in Embodiment 3 is similar to that of operation 5 in Embodiment 1, and details are not described herein again.

Embodiment 4

For an S-shaped curve, dynamic metadata may include statistical values of a video in a memory, such as storable maximum luminance, storable minimum luminance, and storable average luminance; or may include parameters related to the S-shaped curve, such as p, m, a, b, n, K1, K2, and K3.

1: Obtain a first mapping curve parameter set and first maximum target system display luminance.

2: Obtain a display parameter set of a back end.

3: Obtain an adjustment coefficient set.

Technical principles of operations 1 to 3 in Embodiment 4 are respectively similar to those of operations 1 to 3 in Embodiment 1, and details are not described herein again.

4: Adjust one or more parameters in the first mapping curve parameter set based on local maximum display luminance, the first maximum target system display luminance, and the adjustment coefficient set to obtain a second mapping curve parameter set.

One or more parameters in the first mapping curve parameter set satisfying Mb={$p_b$, $m_b$, $a_b$, $b_b$, $n_b$, $K1_b$, $K2_b$, $K3_b$} are adjusted to obtain an adjusted second mapping curve parameter set satisfying Ma={$p_a$, $m_a$, $a_a$, $b_a$, $n_a$, $K1_a$, $K2_a$, $K3_a$}. Main operations are as follows:

A: Traverse the first mapping curve parameter set satisfying Mb={$p_b$, $m_b$, $a_b$, $b_b$, $n_b$, $K1_b$, $K2_b$, $K3_b$} for a parameter $Q_b$ ($Q_b$ is any parameter in Mb). If the adjustment coefficient set $M_\Delta$ includes a corresponding adjustment coefficient $Q_\Delta$, $Q_a = Q_b + k \times Q_\Delta$; otherwise, $Q_a = Q_b$.

$$k = \left(\frac{MaxDisplay - M_{TPL}}{M}\right)^N$$

or $$k = a \times \left(\frac{|MaxDisplay - M_{TPL}|}{M}\right)^N,$$

where a=1 when MaxDisplay>$M_{TPL}$, or a=−1 when MaxDisplay≤$M_{TPL}$; M is a preset luminance value, and is a rational number greater than 0, for example, 100 cd/m², 50 cd/m², or a PQ value corresponding to 100 cd/m²; and N is an adjustment control parameter, and is a rational number greater than 0, for example, 1 or 2.

B: Set $b_a$=MinDisplay or $b_a$=0.

C: For a calculation formula of the scaling factor aa, refer to Embodiment 1. Details are not described herein again.

5: Obtain the mapping curve based on one or more adjusted parameters in the second mapping curve parameter set.

A technical principle of operation 5 in Embodiment 4 is similar to that of operation 5 in Embodiment 1, and details are not described herein again.

Embodiment 5

This embodiment is used to describe pre-operation operations in a process of obtaining a basic HDR curve (parameter) in any one of Embodiments 1 to 4, and specifically includes:

1: Obtain a base curve parameter Stone_mapping from dynamic metadata (metadata) information.

m_p, m_a, m_m, m_n, m_b, K1, K2, and K3 are obtained based on a tone mapping identifier tone_mapping_mode and a base curve identifier base_flag in the metadata information, and a parameter that does not exist is set to an assigned value N_A.

2: Obtain maximum corrected luminance value max_lum of a to-be-processed frame and minimum luminance min_lum of the to-be-processed frame from the metadata information.

The maximum corrected luminance value max_lum of the to-be-processed frame is updated.

3: Update the parameter with the unassigned value in the base curve parameter $S_{tone\_mapping}$ to obtain $P_{tone\_mapping}$.

A: When tone_mapping_mode is 0, the following base curve parameter is invoked to obtain a process update parameter.

An input is maximum display luminance MaxDisplay (a value in a PQ domain) in a display luminance range of a display device, minimum display luminance MinDisplay (a value in the PQ domain) in the display luminance range of the display device, and the metadata information. An output is the base curve parameter $P_{tone\_mapping}$, including m_p, m_a, m_m, m_n, m_b, K1, K2, and K3.

(1) Respectively set m_m, m_n, K1, K2, and K3 to preset values 2.4, 1, 1, 1, and 1. After the foregoing parameters are preset, to obtain a curve $$F(L) = \left(\frac{m\_p \times L}{(m\_p - 1) \times L + 1}\right)^{2.4}.$$

(2) Set m_b to MinDisplay.

(3) Calculate m_p based on average_maxrgb (avgL) in the metadata information.

$$\begin{cases} P_{valueH0}, & avgL > TPH0 \\ P_{valueH0} \times g0(w0) + P_{valueL0} \times (1 - g0(w0)), & avgL \leq TPH0 \\ P_{valueL0}, & avgL < TPL0 \end{cases}$$

$$w0 = \left(\frac{avgL - TPL0}{TPH0 - TPL0}\right),$$

$P_{valueH0}$, $P_{valueL0}$, TPH0, and TPL0 are preset values, and are respectively 3.5, 4.0, 0.6, and 0.3 by default; and g0( ) is $y=x^N$, and y is equal to x by default.

(4) Update m_p based on the maximum corrected luminance value max_lum:

$$\begin{cases} m\_p + P_{deltaH1}, & max\_lum > TPH1 \\ m\_p + P_{deltaH1} \times g1(w1) + P_{deltaL1} \times (1 - g1(w1)), \\ \quad max\_lum \geq TPL1, \; max\_lum \leq TPH1, \\ m\_p + P_{deltaL1}, & max\_lum < TPL1 \end{cases}$$

$$w1 = \left(\frac{max\_lum - TPL1}{TPH1 - TPL1}\right),$$

$P_{deltaH1}$, $P_{deltaL1}$, TPH1, and TPL1 are preset values, and are respectively 0.6, 0.0, 0.9, and 0.75 by default.

(5) Obtain H (L) based on m_p, m_m, m_n, m_b, K1, K2, and K3, $$F(L) = \left(\frac{m\_p \times L^{m\_n}}{(K1 \times m\_p - K2) \times L^{m\_n} + K3}\right)^{m\_m},$$

to obtain $$m\_a = \frac{MaxDisplay - MinDisplay}{H(MaxSource) - H(MinSource)}.$$

MaxSource represents the maximum corrected luminance value max_lum (in the PQ domain) of the to-be-processed frame, and MinSource represents the minimum luminance min_lum (in the PQ domain) of the to-be-processed frame.

B: When tone_mapping_mode is 1, if the maximum target system display luminance targeted_system_display_maximum_luminance is equal to MaxDisplay, set m_p, m_a, m_m, m_n, m_b, K1, K2, and K3 to m_p_0, m_a_0, m_m_0, m_n_0, m_b, K1_0, K2_0 and K3_0; otherwise, adjust the base curve parameter by using any one of the solutions in Embodiments 1 to 4.

It should be noted that, when the foregoing branch B is entered, that is, if tone_mapping_mode is 1, a determining process "if the maximum target system display luminance targeted_system_display_maximum_luminance is equal to MaxDisplay, set m_p, m_a, m_m, m_n, m_b, K1, K2, and K3 to m_p_0, m_a_0, m_m_0, m_n_0, m_b, K1_0, K2_0, and K3_0" is an optional operation, the base curve parameter may be adjusted directly by using any one of the solutions in Embodiment 1 to Embodiment 4, and output results are consistent. Performing the determining process "if the maximum display target system luminance targeted_system_display_maximum_luminance is equal to MaxDisplay, set m_p, m_a, m_m, m_n, m_b, K1, K2, and K3 to m_p_0, m_a_0, m_m_0, m_n_0, m_b, K1_0, K2_0, and K3_0" can reduce complexity and calculation time in an actual hardware embodiment process.

For example, an embodiment of Embodiment 1 may be as follows:

An input is maximum display luminance MaxDisplay (a value in a PQ domain) in a display luminance range of a display device, minimum display luminance MinDisplay (a value in the PQ domain) in the display luminance range of the display device, an RGB color gamut pixel buffer f[Nframe][3] of the to-be-processed frame, and the metadata information including m_p_0, m_a_0, m_m_0, m_n_0, m_b_0, K1_0, K2_0, K3_0, targeted_system_display_maximum_luminance ($M_{TPL}$), and base_param_Delta. An output is the base curve parameter $P_{tone\_mapping}$, including m_p, m_a, m_m, m_n, m_b, K1, K2, and K3.

(1) Respectively set m_m, m_n, K1, K2, and K3 to m_m_0, m_n_0, K1_0, K2_0, and K3 0.

(2) Set m_b to MinDisplay.

$$\text{Set } m\_a = m\_a\_0 \times \frac{MaxDisplay}{M_{TPL}}. \tag{3}$$

$$\text{Set } m\_p = m\_p\_0 + base\_param\_Delta \times \left(\frac{MaxDisplay - M_{TPL}}{PQ\_EOTF^{-1}(100)1}\right)^N, \tag{4}$$

where a default value of N is 1; and if m_p is greater than Tm_p, set m_p to Tm_p, where a default value of Tm_p is Tpa/m_a, and a default value of Tpa is 3.2363, (5) Obtain $$F(L) = m\_a \times \left(\frac{m\_p \times L^{m\_n}}{(K1 \times m\_p - K2) \times L^{m\_n} + K3}\right)^{m\_m}.$$

(6) Substitute L=MaxSource into the following formula to obtain m_a:

$$m\_a = \frac{MaxDisplay - MinDisplay}{\left(\frac{m\_p \times L^{m\_n}}{(K1 \times m\_p - K2) \times L^{m\_n} + K3_a}\right)^{m\_m}}.$$

For example, an embodiment of Embodiment 2 may be as follows:

An input is maximum display luminance MaxDisplay (a value in a PQ domain) in a display luminance range of a display device, minimum display luminance MinDisplay (a value in the PQ domain) in the display luminance range of the display device, average_maxrgb in metadata, RGB color gamut pixel buffer f[Nframe][3] of the to-be-processed frame, and the metadata information including m_p_0, m_m_0, m_n_0, m_a_0, m_b_0, K1_0, K2_0, K3_0, targeted_system_display_maximum_luminance ($M_{TPL}$), and base_param_Delta. An output is the base curve parameter $P_{tone\_mapping}$, including m_p, m_m, m_n, m_a, m_b, K1, K2, and K3.

(1) Generate a base curve parameter $P1_{tone\_mapping}$, including m_p_1, m_m_1, m_n_1, m_a_1, m_b_1, K1_1, K2_1, and K3_1.

(2) Calculate $$w = \text{base\_param\_Delta} \times \left(\frac{|MaxDisplay - M_{TPL}|}{PQ\_EOTF^{-1}(100)}\right)^N,$$

where N is a number greater than 0, and is 1 by default; w is greater than or equal to 0 and less than or equal to 1.

(3) Calculate m_p, m_m, m_n, K1, K2, and K3 according to the following formulas:

$$m\_p = (1-w) \times m\_p\_0 + w \times m\_p\_1,$$

$$m\_m = (1-w) \times m\_m\_0 + w \times m\_m\_1,$$

$$m\_n = (1-w) \times m\_n\_0 + w \times m\_n\_1,$$

$$K1 = (1-w) \times K1\_0 + w \times K1\_1,$$

$$K2 = (1-w) \times K2\_0 + w \times K2\_1, \text{ and}$$

$$K3 = (1-w) \times K3\_0 + w \times K3\_1.$$

(4) Set m_b to MinDisplay.
(5) Obtain $$F(L) = m\_a \times \left(\frac{m\_p \times L^{m\_n}}{(K1 \times m\_p - K2) \times L^{m\_n} + K3}\right)^{m\_m}$$

(6) Substitute L-MaxSource into the following formula to obtain m_a:

$$m\_a = \frac{MaxDisplay - MinDisplay}{\left(\frac{m\_p \times L^{m\_n}}{(K1 \times m\_p - K2) \times L^{m\_n} + K3_a}\right)^{m\_m}}.$$

Figure 11:
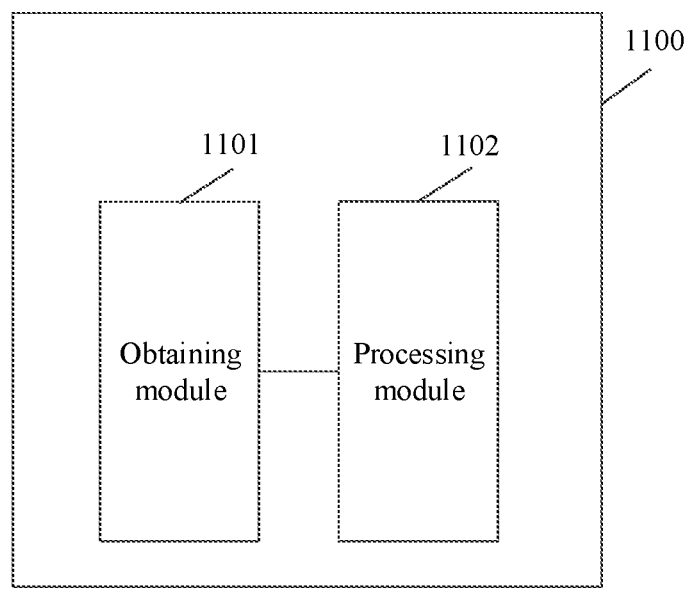
FIG. 11 is a structural block diagram of a video processing apparatus 1100 configured to implement an embodiment of this application.

Based on a same inventive idea as the foregoing method, an embodiment of this application further provides a video processing apparatus. FIG. 11 is a structural block diagram of a video processing apparatus 1100 configured to implement an embodiment of this application. As shown in FIG. 11, the video processing apparatus 1100 includes an obtaining module 1101 and a processing module 1102. The obtaining module 1101 is configured to: obtain a first mapping curve parameter set and first maximum target system display luminance, where the first mapping curve parameter set corresponds to the first maximum target system display luminance, and the first mapping curve parameter set includes one or more parameters related to a mapping curve; obtain a display luminance parameter set, where the display luminance parameter set includes maximum display luminance and/or minimum display luminance of a display device; and obtain an adjustment coefficient set, where the adjustment coefficient set includes one or more adjustment coefficients, and the one or more adjustment coefficients correspond to the one or more parameters in the first mapping curve parameter set. The processing module 1102 is configured to adjust the one or more parameters in the first mapping curve parameter set based on the display luminance parameter set, the first maximum target system display luminance, and the adjustment coefficient set to obtain a second mapping curve parameter set, where the second mapping curve parameter set includes one or more adjusted parameters.

In a possible embodiment, the processing module 1102 is specifically configured to calculate an adjusted first parameter according to formula (1), where the first parameter is any parameter in the first mapping curve parameter set:

$$P_a = P_b + k \times P_\Delta \tag{1}$$

where $P_a$ represents the adjusted first parameter, $P_b$ represents the first parameter, $P_\Delta$ represents a adjustment coefficient corresponding to the first parameter, and $$k = \left(\frac{MaxDisplay - M_{TPL}}{M}\right)^N$$

or $$k = a \times \left(\frac{|MaxDisplay - M_{TPL}|}{M}\right)^N,$$

where a=1 when MaxDisplay>$M_{TPL}$, or a=−1 when MaxDisplay≤$M_{TPL}$; MaxDisplay represents the maximum display luminance, $M_{TPL}$ represents the first maximum target system display luminance, N represents an adjustment control parameter, and M represents a preset luminance value.

In a possible embodiment, the obtaining module 1101 is further configured to: obtain one or more of storable maximum luminance, storable minimum luminance, a storable average value, and a storable variation range; and obtain an intermediate value of a first parameter based on one or more of the maximum display luminance, the minimum display luminance, the storable maximum luminance, the storable minimum luminance, the storable average value, and the storable variation range, where the first parameter is any parameter in the first mapping curve parameter set. The processing module 1102 is specifically configured to calculate an adjusted first parameter according to formula (2):

$$P_a = (1-w) \times P_b + w \times P_m \tag{2}$$

where $P_a$ represents the adjusted first parameter, $P_b$ represents the first parameter, and $$w = P_\Delta \times \left(\frac{MaxDisplay - M_{TPL}}{M}\right)^N$$

or $$w = P_\Delta \times \left(\frac{|MaxDisplay - M_{TPL}|}{M}\right)^N,\qquad(5)$$

where $P_\Delta$ represents a adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

In a possible embodiment, the processing module 1102 is further configured to: obtain a first mapping curve based on the adjusted first parameter and a parameter in the first mapping curve parameter set other than the first parameter, and continue to adjust the first parameter if luminance of a video obtained by performing tone mapping based on the first mapping curve is higher than original luminance of the video; or analyze the adjusted first parameter according to a preset rule, and continue to adjust the first parameter if the adjusted first parameter complies with the preset rule.

In a possible embodiment, the processing module 1102 is specifically configured to: when the first mapping curve parameter set includes a scaling factor, calculate an adjusted scaling factor according to formula (3):

$$r_a = \frac{MaxDisplay}{f(MaxSource, P1_a, P2_a, \ldots)} \qquad(3)$$

where $r_a$ represents the adjusted scaling factor, $P1_a$, $P2_a$, ... represents a parameter in the second mapping curve parameter set, MaxSource represents storable maximum luminance of the video in a memory, $f(MaxSource, P1_a, P2_a, \ldots)$ represents function calculation that is related to the storable maximum luminance of the video in the memory and one or more adjusted parameters in the second mapping curve parameter set, and MaxDisplay represents the maximum display luminance.

In a possible embodiment, the processing module 1102 is specifically configured to: when the first mapping curve parameter set includes a scaling factor, calculate an adjusted scaling factor according to formula (4):

$$r_a = \frac{MaxDisplay - MinDisplay}{f(MaxSource, P1_a, P2_a, \ldots) - f(MinSource, P1_a, P2_a, \ldots)} \qquad(4)$$

where $r_a$ represents the adjusted scaling factor, $P1_a$, $P2_a$, ... represents a parameter in the second mapping curve parameter set, MaxSource represents storable maximum luminance of the video in a memory, MinSource represents storable minimum luminance of the video in the memory, $f(MaxSource, P1_a, P2_a, \ldots)$ represents function calculation that is related to the storable maximum luminance of the video in the memory and one or more adjusted parameters in the second mapping curve parameter set, $f(MinSource, P1_a, P2_a, \ldots)$ represents function calculation that is related to the storable minimum luminance of the video in the memory and one or more adjusted parameters in the second mapping curve parameter set, MaxDisplay represents the maximum display luminance, and MinDisplay represents the minimum display luminance.

In a possible embodiment, the processing module 1102 is specifically configured to: when the first mapping curve parameter set includes a scaling factor, calculate an adjusted scaling factor according to formula (5):

$$r_a = \frac{MaxDisplay - MinDisplay}{f(MaxSource, P1_a, P2_a, \ldots)} \qquad(5)$$

where $r_a$ represents the adjusted scaling factor, $P1_a$, $P2_a$, ... represents a parameter in the second mapping curve parameter set, MaxSource represents storable maximum luminance of the video in a memory, $f(MaxSource, P1_a, P2_a, \ldots)$ represents function calculation that is related to the storable maximum luminance of the video in the memory and one or more adjusted parameters in the second mapping curve parameter set, MaxDisplay represents the maximum display luminance, and MinDisplay represents the minimum display luminance.

In a possible embodiment, the processing module 1102 is specifically configured to: when the first mapping curve parameter set includes a scaling factor, calculate an adjusted scaling factor according to formula (6):

$$r_a = \frac{MaxDisplay}{f(MaxSource, P1_a, P2_a, \ldots) - f(MinSource, P1_a, P2_a, \ldots)} \qquad(6)$$

where $r_a$ represents the adjusted scaling factor, $P1_a$, $P2_a$, ... represents a parameter in the second mapping curve parameter set, MaxSource represents storable maximum luminance of the video in a memory, MinSource represents storable minimum luminance of the video in the memory, $f(MaxSource, P1_a, P2_a, \ldots)$ represents function calculation that is related to the storable maximum luminance of the video in the memory and one or more adjusted parameters in the second mapping curve parameter set, $f(MinSource, P1_a, P2_a, \ldots)$ represents function calculation that is related to the storable minimum luminance of the video in the memory and one or more adjusted parameters in the second mapping curve parameter set, and MaxDisplay represents the maximum display luminance.

In a possible embodiment, the obtaining module 1101 is specifically configured to: obtain the first mapping curve parameter set and the first maximum target system display luminance from dynamic metadata of the video; or obtain the first mapping curve parameter set from dynamic metadata; and obtain, based on a specified correspondence, the first maximum target system display luminance corresponding to the first mapping curve parameter set.

In a possible embodiment, the obtaining module 1101 is specifically configured to: obtain the adjustment coefficient set from the dynamic metadata of the video; or obtain the adjustment coefficient set based on a preset value.

In a possible embodiment, the obtaining module 1101 is specifically configured to: directly read one or more adjustment coefficients; or obtain an adjustment mode, and obtain one or more adjustment coefficients corresponding to the adjustment mode.

In a possible embodiment, the obtaining module 1101 is specifically configured to: obtain the display luminance parameter set based on device information; or obtain the display luminance parameter set based on preset information.

In a possible embodiment, the obtaining module 1101 is further configured to obtain the mapping curve based on the one or more adjusted parameters in the second mapping curve parameter set.

It should be further noted that for specific embodiment processes of the obtaining module 1101 and the processing module 1102, refer to detailed descriptions in the embodiment in FIG. 10. For brevity of the specification, details are not described herein again.

A person skilled in the art can appreciate that functions described with reference to various illustrative logical blocks, modules, and algorithm operations disclosed and described herein in this specification be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit.

The computer-readable medium may include a computer-readable storage medium, which corresponds to a tangible medium such as a data storage medium, or may include any communication medium that facilitates transmission of a computer program from one place to another (for example, according to a communications protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such a computer-readable storage medium may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is appropriately referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuit. Therefore, the term "processor" used in this specification may refer to the foregoing structure, or any other structure that is applicable to embodiment of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of devices configured to perform the disclosed techniques, but do not necessarily require realization by different hardware units. Actually, as described above, various units may be combined in an encoder and decoder hardware unit in combination with appropriate software and/or firmware, or may be provided by interoperable hardware units (including one or more processors described above).

In the foregoing embodiments, descriptions of each embodiment have respective focuses. For a part that is not described in detail in an embodiment, refer to related descriptions in other embodiments.

The foregoing descriptions are merely example specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining a mapping curve parameter, comprising:

obtaining a first mapping curve parameter set and first maximum target system display luminance, wherein the first mapping curve parameter set corresponds to the first maximum target system display luminance, and the first mapping curve parameter set comprises one or more parameters related to a mapping curve;

obtaining a display luminance parameter set that comprises maximum display luminance and/or minimum display luminance of a display device;

obtaining an adjustment coefficient set that comprises one or more adjustment coefficients that correspond to the one or more parameters in the first mapping curve parameter set; and adjusting the one or more parameters in the first mapping curve parameter set based on the display luminance parameter set, the first maximum target system display luminance, and the adjustment coefficient set to obtain a second mapping curve parameter set that comprises one or more adjusted parameters;

wherein before the adjusting the one or more parameters in the first mapping curve parameter set based on the display luminance parameter set, the first maximum target system display luminance, and the adjustment coefficient set to obtain the second mapping curve parameter set, the method further comprises:

obtaining one or more of maximum luminance, minimum luminance, an average value, and a variation range of to-be-displayed content; and obtaining an intermediate value of a first parameter based on one or more of the maximum display luminance, the minimum display luminance, the maximum luminance, the minimum luminance, the average value, and the variation range, wherein the first parameter is any parameter in the first mapping curve parameter set; and the adjusting the one or more parameters in the first mapping curve parameter set based on the display luminance parameter set, the first maximum target system display luminance, and the adjustment coefficient set to obtain the second mapping curve parameter set comprises:

calculating an adjusted first parameter according to formula (1), wherein the adjusted first parameter belongs to the second mapping curve parameter set:

$$P_a = (1-w) \times P_b + w \times P_m \qquad (1)$$

wherein $P_a$ represents the adjusted first parameter, $P_b$ represents the first parameter, and $$w = P_\Delta \times \left( \frac{MaxDisplay - M_{TPL}}{M} \right)^N$$

or $$w = P_\Delta \times \left( \frac{|MaxDisplay - M_{TPL}|}{M} \right)^N,$$

wherein $P_\Delta$ represents an adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

2. The method according to claim 1, wherein the obtaining a first mapping curve parameter set and first maximum target system display luminance comprises:
obtaining the first mapping curve parameter set and the first maximum target system display luminance from dynamic metadata of the to-be-displayed content; or
obtaining the first mapping curve parameter set from dynamic metadata; and obtaining, based on a specified correspondence, the first maximum target system display luminance corresponding to the first mapping curve parameter set.

3. The method according to claim 1, wherein the obtaining the adjustment coefficient set comprises:
obtaining the adjustment coefficient set from dynamic metadata of the to-be-displayed content; or
obtaining the adjustment coefficient set based on a preset value.

4. The method according to claim 1, wherein after the calculating the adjusted first parameter according to the formula, the method further comprises:
obtaining a first mapping curve based on the adjusted first parameter and a parameter in the first mapping curve parameter set other than the first parameter, and continuing to adjust the first parameter if luminance of the to-be-displayed content obtained by performing tone mapping based on the first mapping curve is higher than original luminance of the to-be-displayed content; or
analyzing the adjusted first parameter according to a preset rule, and continuing to adjust the first parameter if the adjusted first parameter complies with the preset rule.

5. The method according to claim 1, wherein the adjusting the one or more parameters in the first mapping curve parameter set based on the display luminance parameter set, the first maximum target system display luminance, and the adjustment coefficient set to obtain the second mapping curve parameter set comprises:
when the first mapping curve parameter set comprises a scaling factor, calculating an adjusted scaling factor according to a following formula:

$$r_a = \frac{MaxDisplay - MinDisplay}{f(MaxSource, P1_a, P2_a, \ldots )}$$

wherein $r_a$ represents the adjusted scaling factor, $P1_a$, $P2_a$, ... represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, MaxDisplay represents the maximum display luminance, and MinDisplay represents the minimum display luminance.

6. A video processing apparatus, comprising:
one or more processors,
a memory, configured to store one or more programs, wherein when the one or more programs are executed by the one or more processors, the one or more processors are configured to perform operations to:
obtain a first mapping curve parameter set and first maximum target system display luminance, wherein the first mapping curve parameter set corresponds to the first maximum target system display luminance, and the first mapping curve parameter set comprises one or more parameters related to a mapping curve;
obtain a display luminance parameter set that comprises maximum display luminance and/or minimum display luminance of a display device; and obtain an adjustment coefficient set that comprises one or more adjustment coefficients that correspond to the one or more parameters in the first mapping curve parameter set, and
adjust the one or more parameters in the first mapping curve parameter set based on the display luminance parameter set, the first maximum target system display luminance, and the adjustment coefficient set to obtain a second mapping curve parameter set that comprises one or more adjusted parameters;
wherein the one or more processors are further configured to:
obtain one or more of maximum luminance, minimum luminance, an average value, and a variation range of to-be-displayed content; and obtain an intermediate value of a first parameter based on one or more of the maximum display luminance, the minimum display luminance, the maximum luminance, the minimum luminance, the average value, and the variation range, wherein the first parameter is any parameter in the first mapping curve parameter set; and
the one or more processors are further configured to calculate an adjusted first parameter according to formula (1), wherein the adjusted first parameter belongs to the second mapping curve parameter set:

$$P_a = (1-w) \times P_b + w \times P_m \qquad (1)$$

wherein $P_a$ represents the adjusted first parameter, $P_b$ represents the first parameter, and $$w = P_\Delta \times \left( \frac{MaxDisplay - M_{TPL}}{M} \right)^N$$

or $$w = P_\Delta \times \left( \frac{|MaxDisplay - M_{TPL}|}{M} \right)^N,$$

wherein $P_\Delta$ represents an adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

7. The apparatus according to claim 6, wherein the one or more processors are further configured to:
obtain the first mapping curve parameter set and the first maximum target system display luminance from dynamic metadata of the to-be-displayed content; or
obtain the first mapping curve parameter set from dynamic metadata; and obtain, based on a specified correspondence, the first maximum target system display luminance corresponding to the first mapping curve parameter set.

8. The apparatus according to claim 6, wherein the one or more processors are further configured to:
obtain the adjustment coefficient set from the dynamic metadata of the to-be-displayed content; or
obtain the adjustment coefficient set based on a preset value.

9. The apparatus according to claim 6, wherein the one or more processors are further configured to:
obtain a first mapping curve based on the adjusted first parameter and a parameter in the first mapping curve parameter set other than the first parameter, and continue to adjust the first parameter if luminance of the to-be-displayed content obtained by performing tone mapping based on the first mapping curve is higher than original luminance of the to-be-displayed content; or
analyze the adjusted first parameter according to a preset rule, and continue to adjust the first parameter if the adjusted first parameter complies with the preset rule.

10. The apparatus according to claim 6, wherein the one or more processors are further configured to:
when the first mapping curve parameter set comprises a scaling factor, calculate an adjusted scaling factor according to a following formula:

$$r_a = \frac{MaxDisplay - MinDisplay}{f(MaxSource, P1_a, P2_a, \ldots)}$$

wherein $r_a$ represents the adjusted scaling factor, $P1_a$, $jP2_a, \ldots$ represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, MaxDisplay represents the maximum display luminance, and MinDisplay represents the minimum display luminance.

11. A non-transitory computer-readable storage medium, comprising a computer program, wherein when the computer program is executed on a computer or a processor, the computer or the processor is configured to perform operations, comprising:
obtaining a first mapping curve parameter set and first maximum target system display luminance, wherein the first mapping curve parameter set corresponds to the first maximum target system display luminance, and the first mapping curve parameter set comprises one or more parameters related to a mapping curve;
obtaining a display luminance parameter set that comprises maximum display luminance and/or minimum display luminance of a display device;
obtaining an adjustment coefficient set that comprises one or more adjustment coefficients that correspond to the one or more parameters in the first mapping curve parameter set; and
adjusting the one or more parameters in the first mapping curve parameter set based on the display luminance parameter set, the first maximum target system display luminance, and the adjustment coefficient set to obtain a second mapping curve parameter set that comprises one or more adjusted parameters;
wherein the computer or the processor is further configured to perform operations to:
obtain one or more of maximum luminance, minimum luminance, an average value, and a variation range of to-be-displayed content; and obtain an intermediate value of a first parameter based on one or more of the maximum display luminance, the minimum display luminance, the maximum luminance, the minimum luminance, the average value, and the variation range, wherein the first parameter is any parameter in the first mapping curve parameter set; and
calculate an adjusted first parameter according to formula (1), wherein the adjusted first parameter belongs to the second mapping curve parameter set:

$$P_a = (1-w) \times P_b + w \times P_m \quad (1)$$

wherein $P_a$ represents the adjusted first parameter, $P_b$ represents the first parameter, and $$w = P_\Delta \times \left( \frac{MaxDisplay - M_{TPL}}{M} \right)^N$$

or $$w = P_\Delta \times \left( \frac{|MaxDisplay - M_{TPL}|}{M} \right)^N,$$

wherein $P_\Delta$ represents a adjustment coefficient corresponding to the first parameter, MaxDisplay represents the maximum display luminance, $M_{TPL}$ represents the first maximum target system display luminance, N represents an adjustment control parameter, M represents a preset luminance value, and $P_m$ represents the intermediate value of the first parameter.

12. The computer-readable storage medium according to claim 11, wherein the computer or the processor is further configured to perform operations to:
obtain the first mapping curve parameter set and the first maximum target system display luminance from dynamic metadata of the to-be-displayed content; or
obtain the first mapping curve parameter set from dynamic metadata; and obtain, based on a specified correspondence, the first maximum target system display luminance corresponding to the first mapping curve parameter set.

13. The computer-readable storage medium according to claim 11, the computer or the processor is further configured to perform operations to:
obtain a first mapping curve based on the adjusted first parameter and a parameter in the first mapping curve parameter set other than the first parameter, and continue to adjust the first parameter if luminance of the to-be-displayed content obtained by performing tone mapping based on the first mapping curve is higher than original luminance of the to-be-displayed content; or
analyze the adjusted first parameter according to a preset rule, and continue to adjust the first parameter if the adjusted first parameter complies with the preset rule.

14. The computer-readable storage medium according to claim 11, the computer or the processor is further configured to perform operations to:
when the first mapping curve parameter set comprises a scaling factor, calculate an adjusted scaling factor according to a following formula:

$$r_a = \frac{MaxDisplay - MinDisplay}{f(MaxSource, P1_a, P2_a, \ldots)}$$

wherein $r_a$ represents the adjusted scaling factor, $P1_a$, $P2_a$, . . . represents a parameter in the second mapping curve parameter set, MaxSource represents maximum luminance of the to-be-displayed content in a memory, $f(MaxSource, P1_a, P2_a, \ldots)$ represents function calculation that is related to the maximum luminance of the to-be-displayed content in the memory and one or more adjusted parameters in the second mapping curve parameter set, MaxDisplay represents the maximum display luminance, and MinDisplay represents the minimum display luminance.

* * * * *